(12) United States Patent
Yamada et al.

(10) Patent No.: US 6,339,480 B1
(45) Date of Patent: Jan. 15, 2002

(54) PRINT DRIVER FOR A COLOR PRINTER

(75) Inventors: Akitoshi Yamada; Hiromitsu Hirabayashi; Takao Aichi; Kazuyuki Masumoto; Akihiko Sukigara; Tetsuya Kawanabe; Masashi Kamada; Osamu Hirata, all of Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/901,719

(22) Filed: Jul. 28, 1997

(51) Int. Cl.[7] .................... G06K 15/10; H04N 1/034; H04N 1/191; H04N 1/21; H04N 1/50
(52) U.S. Cl. .................. 358/1.8; 358/1.16; 358/1.9; 358/502; 358/524
(58) Field of Search .................... 358/1.8, 1.16, 358/296, 444, 502, 503, 524; 347/40, 43, 172, 181, 173, 232, 233; 400/120.05, 124.08, 124.09, 124.11, 120.02; 365/231

(56) References Cited

U.S. PATENT DOCUMENTS

| | | | |
|---|---|---|---|
| 4,153,950 A | * 5/1979 | Nosowicz et al. | 365/231 |
| 4,567,570 A | 1/1986 | Peer | |
| 5,075,875 A | 12/1991 | Love et al. | |
| 5,347,617 A | 9/1994 | Webb et al. | |
| 5,427,461 A | 6/1995 | Hirai et al. | |
| 5,477,246 A | 12/1995 | Hirabayashi et al. | 347/12 |
| 5,500,661 A | 3/1996 | Matsubara et al. | 347/41 |
| 5,511,151 A | * 4/1996 | Russell et al. | 358/1.16 |
| 5,553,205 A | 9/1996 | Murray | |
| 5,559,535 A | 9/1996 | Otsuka et al. | 347/14 |
| 5,581,295 A | 12/1996 | Prowak | 347/237 |
| 5,619,622 A | 4/1997 | Audi et al. | |
| 5,696,542 A | 12/1997 | Matsubara et al. | 347/12 |
| 5,708,463 A | 1/1998 | Hirabayashi et al. | 347/43 |
| 5,751,304 A | 5/1998 | Hirabayashi et al. | 347/17 |
| 5,793,939 A | * 8/1998 | Sagayama | 358/1.8 |
| 5,806,997 A | 9/1998 | Kawanabe | |
| 6,009,245 A | * 12/1999 | Kato et al. | 358/1.8 |

FOREIGN PATENT DOCUMENTS

| | | | |
|---|---|---|---|
| EP | 712 234 A2 | * 5/1996 | H04N/1/00 |
| EP | 871139 | 12/1998 | |
| JP | 60-139473 | 7/1985 | |
| JP | 8-142349 | 6/1996 | |
| JP | 8-150735 | 6/1996 | |
| JP | 8-150736 | 6/1996 | |
| JP | 8-150737 | 6/1996 | |

* cited by examiner

*Primary Examiner*—Scott Rogers
(74) *Attorney, Agent, or Firm*—Fitzpatrick, Cella, Harper & Scinto

(57) ABSTRACT

A color printer driver binarizes continuous tone color print data stored in raster form and stores the binarized data directly into column form, without the intermediary of storage in horizontal raster form, for printout by a print engine having vertically-arranged print elements.

143 Claims, 22 Drawing Sheets

FIG. 3
(Prior Art)

PRINT DRIVER FOR A COLOR PRINTER

BACKGROUND OF THE INVENTION

1. Field Of The Invention

The present invention relates to a print driver for a color printer, specifically a print driver executable in a host computer so as to derive color component data for transfer to and print-out by the color printer.

2. Description Of The Related Art

Color printers for personal use or for SOHO (small office home office) use have in recent years become extremely popular. These color printers print color images by scanning a band on a recording medium and superimposing plural color components (such as cyan, magenta, yellow and black color components) on the band.

One frequent use for such color printers is to print out a color image representative of a continuous tone (or multilevel) color image displayed on a monitor or otherwise stored in a computerized image file. Continuous tone color images are ordinarily stored in raster bitmap format, with each pixel of the color image having a corresponding color value stored for each of plural color primaries, such as red, green and blue color primaries.

FIG. 1 is a representational view of such a bitmap image 10. As seen in FIG. 1, bitmap image 10 is comprised by multilevel image data for three color planes, a red color plane R, a green color plane G, and a blue color plane B. Each pixel of the color image has corresponding pixel data $11r$, $11g$ and $11b$ in each color plane. For each of the RGB color planes, pixels $11r$, $11g$ and $11b$ are arranged in a two-dimensional raster array of pixels so as to form a rasterized bitmap image. In the example of FIG. 1, each of pixel data $11r$, $11g$ and $11b$ is stored in an eight bit byte. Thus, the color of each pixel in the color image is represented by 24 bits of pixel data, and is commonly referred to as 24-bit or 16 million color data.

Color printers of the type in question, however, do not now have the ability to print continuous tone images. Rather, these color printers are binary printers since they can only deposit, or not deposit, a color dot at each pixel location. In keeping with the separate RGB color planes for continuous tone multilevel data, binary bitmap data for the printer is comprised by separate color planes of binary print data for each printer colorant. FIG. 1 depicts a typical situation in which there are four printer colorants and thus four color planes: a cyan color plane C, a magenta color plane M, a yellow color plane Y, and a black color plane K. For each of the CMYK color planes, pixels $11c$, $11m$, $11y$ and $11k$ are arranged in a two-dimensional raster array of pixels so as to form a rasterized bitmap image. Since it is binary data, however, each of pixel data $11c$, $11m$, $11y$ and $11k$ is stored as one binary bit.

Accordingly, to print a color image representative of continuous tone color image data, it is necessary first to binarize the continuous tone color data for each pixel so that each pixel in the print image is represented by one bit per pixel for each colorant. This process is depicted in the flow diagram of FIG. 2.

Thus, as seen in FIG. 2, continuous tone raster image data is binarized into binary raster data in step S201. Such binarization can be performed by known techniques including dither techniques or error diffusion techniques. The result of binarization is stored in raster bitmap image form, with one bit for each pixel in each printer colorant plane.

Figure 3:
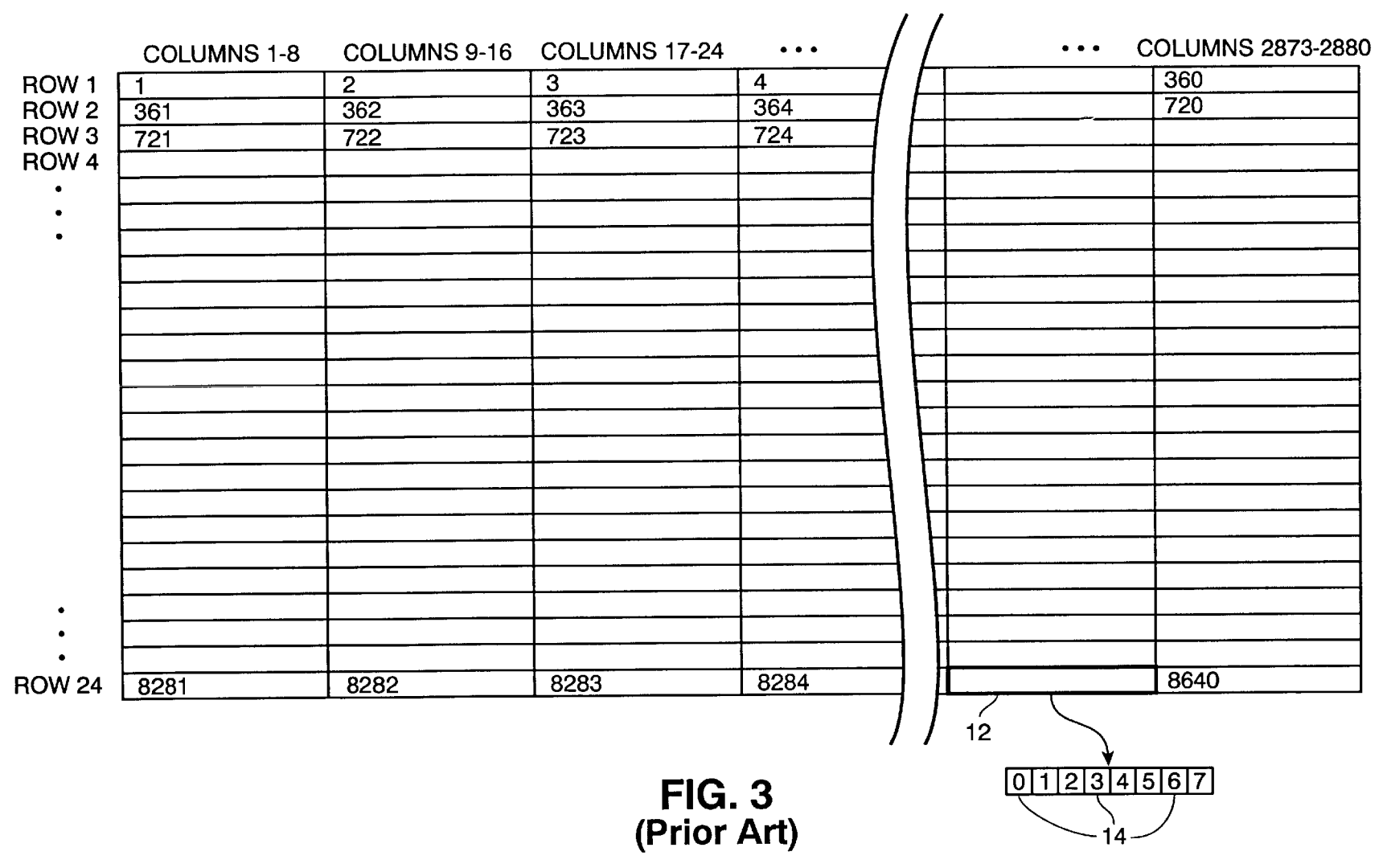

FIG. 3 depicts such binarized raster image data for each color plane. As seen there, and in keeping with the rasterized form of color image data in FIG. 1, binary image data is stored in successive bits of successive bytes in a suitably-sized block of memory. For a typical printer printing at 360 dots per inch (dpi) across an eight inch wide recording medium, 360×8=2,880 bits of data are required. Each of these bits are stored into successive bits in eight bit bytes of data. Accordingly, (2,880 bits)/(8 bits per byte)=360 bytes are required to store a single row of print data. For a print head with 24 nozzles for each printer colorant, a 360×24= 8,640 byte block of memory is needed for each color plane, as depicted in FIG. 3. These 8,640 bytes are allocated sequentially in memory, as depicted by the serial numbers 1 through 8,640 shown in FIG. 3, and each byte 12 contains 8 sequential binary bits 14 of binary print data.

FIG. 4 shows the configuration of a typical vertically-oriented print head, in which 24 print nozzles are provided for yellow colorant, 24 print nozzles are provided for magenta colorant, 24 print nozzles are provided for cyan colorant, and 64 print nozzles are provided for black colorant. As seen in FIG. 4, the nozzles are positioned vertically or near vertically, one on top of the other. The print head is driven horizontally across a recording medium in the direction of arrow A so as to effect recording on one band of the recording medium.

Because the geometry of the nozzles on the print head are oriented vertically, whereas the print data stored in memory (FIG. 3) is stored horizontally, there is a need to convert the horizontal raster data of FIG. 3 into column data for use by the print head. Such a step is known in the art, and is depicted in step S202 of FIG. 2. Resulting column format data is depicted in FIG. 5. As seen there, there are still 8,640 bytes of 8-bit binary print data, corresponding to the same 2,880×24 pixel printing band shown in FIG. 3, but the binary print data is re-organized into column format. Thus 8,640 bytes are allocated sequentially in memory, as depicted by the serial numbers 1 through 8,640, and each byte 15 contains 8 sequential (but column organized) binary bits 16 of binary print data.

Thus, according to conventional techniques for printing a color image representative of a continuous tone color image, the continuous tone color image must be binarized into raster data as mentioned previously in connection with step S201, and the horizontal raster data must be converted into vertical column data, as depicted in step S202. Thereafter, as shown in step S203, each of the binarized color planes is shifted so as to account for vertical offset between groups of nozzles in the print head (step S203), and the shifted color data is printed out (step S204).

Thus, according to conventional techniques for printing out color image data, binarized raster data must be converted from horizontal raster data into column data. This conversion step inevitably slows processing time, and leads to increasingly complex processing.

SUMMARY OF THE INVENTION

It is an object of the invention to address the foregoing disadvantages found in prior art systems by storing binarized data directly into column format at the same time as the binarization process, without the intermediary of storing the binarized data in horizontal raster form.

Thus, according to one aspect of the invention, a print driver is executable in a host computer so as to output color component data for each of plural color components to a color printer that has a vertically-oriented print head and that forms color images in a band on a recording medium by plural scans respectively corresponding to each of plural color components. A print driver according to the invention accesses color data for successive pixels of a continuous tone image, binarizes each successive pixel into each of plural color components corresponding to color components on the print head, and stores the binarized data for each pixel in column format without the intermediary of storage in horizontal raster format. Preferably, the binarized color data in column format is shifted so as to account for vertical offset between groups of color print nozzles, and the binarized-and-shifted column data is communicated from the host computer over an interface such as a bi-directional interface to a color printer for print out thereby.

By virtue of the foregoing arrangement, in which binarized color component data is derived and stored directly in column format from continuous tone color data, it is possible to avoid the introduction of additional processing steps that are needed in conventional devices so as to convert horizontal raster data to vertical column data.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 3 is a representation of memory for storing raster image data.

DETAILED DESCRIPTION OF THE PREFERRED EMBODIMENTS

Detailed descriptions of the preferred embodiments will be given in respect of a representative printer from which the benefits and advantages of the invention can be appreciated. In this case, the representative printer is a printer having two print heads, which is sometimes called a "shuttle printer". As will be appreciated, the invention can also be practiced with a printer having one or more than one heads; however additional benefits arise when the invention is used in connection with a printer having two or more heads.

Figure 6:
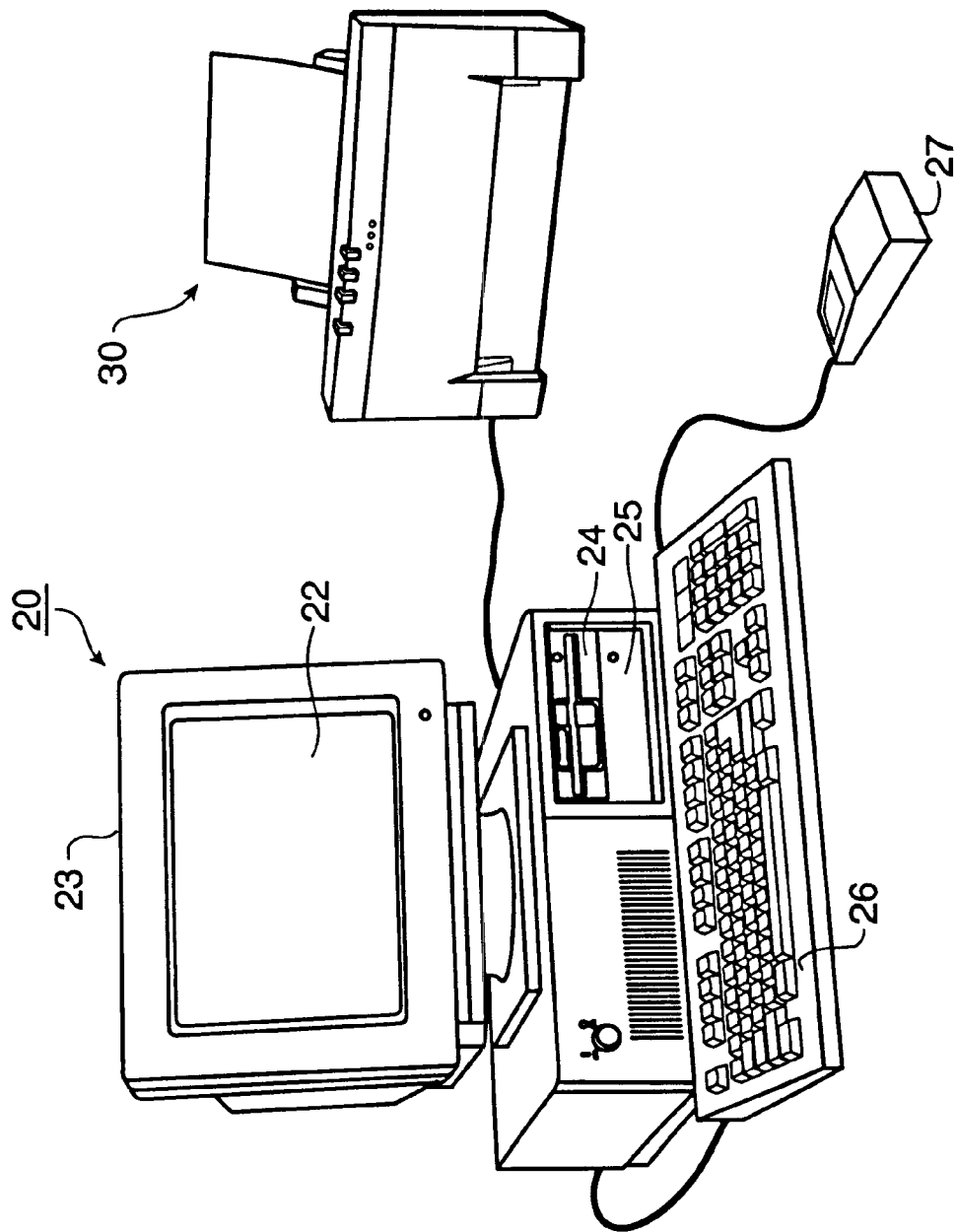
FIG. 6 is a perspective view showing the outward appearance of representative computing equipment which incorporates a print driver according to the invention.

FIG. 6 is a view showing the outward appearance of representative computing equipment which incorporates a print driver according to the invention. Shown in FIG. 6 is computing equipment 20 such as an IBM PC or PC-compatible computer having a windowing operating system such as a Microsoft Windows® operating system. Computing equipment 20 is provided with a display monitor 23 having a display screen 22 on which computing equipment 20 displays images to the user. Computing equipment 20 is further provided with a floppy disk drive 24 with which removable floppy disk media may be read or written, fixed disk drive 25 for storing data files and application program files, a keyboard 26 for permitting input of text data and manipulation of objects displayed on display screen 22, and a pointing device 27 such as a mouse or the like which is also provided to permit manipulation of objects on display screen 22.

Other connections may be provided to computing equipment 20, such as a connection or interface to a local area network or to facsimile/modem/telephone interface, both for sending and receiving color image data as well as other files such as files which include program instruction sequences by which computing equipment 20 is operated.

A printer 30 having dual print heads, such as a color bubble jet printer, is interfaced to computing equipment 20. Interface between computing equipment 20 and printer 30 may be of any variety, such as an infrared interface or a standard Centronics printer interface, but the interface shown here is an IEEE 1284 bi-directional interface, which allows sending and receiving of data by both computing equipment 20 and printer 30. Printer 30 includes a pair of bubble jet print heads, with each having plural ink ejection nozzles aligned vertically in groups of each of plural colors, as described more fully below.

In accordance with operator instructions, and under control of the windowing operating system, stored application programs such as graphics application programs, drawing application programs, desktop publishing application programs, and the like, are selectively activated to process and to manipulate data. Also in accordance with operator instructions, and based on those stored application programs, commands are issued to display images on monitor 23 and also to print images appearing on monitor 23 on printer 30.

Figure 7:
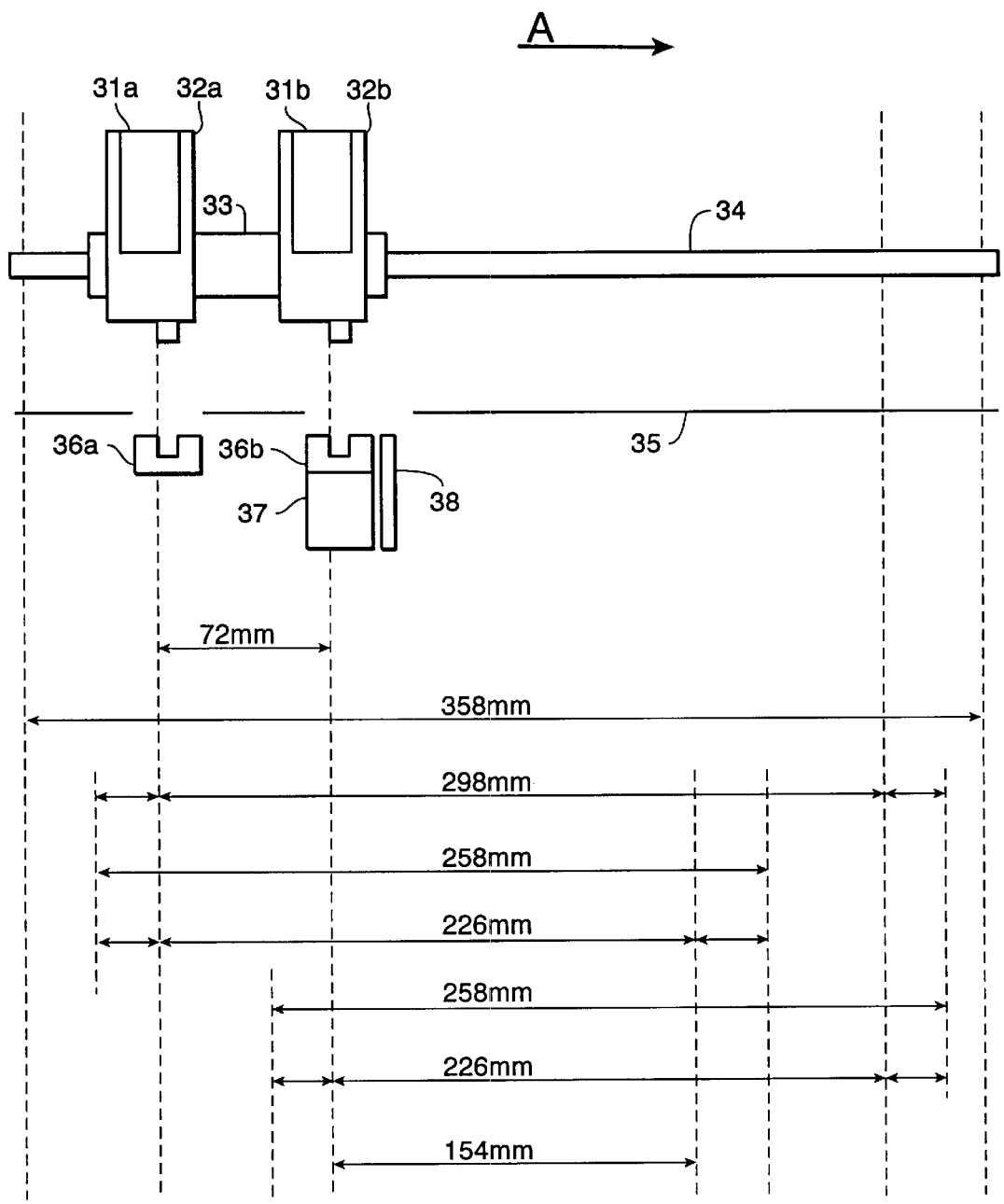
FIG. 7 is a schematic view of a dual head printer.

FIG. 7 is a schematic view of the arrangement of the dual print heads in printer 30. Each of print heads 31a and 31b are mounted on carriage 33 with a fixed separation such as 72 mm. Ink tanks 32a and 32b are respectively provided for each print head, and supply different colored inks such as cyan, magenta, yellow and black inks to their respective print head. Such an arrangement allows each tank in each printer head to be independently installed and removed from carriage 33.

Carriage 33 is supported for reciprocal back and forth sliding motion in the direction of arrow A on guide rail 34, and carriage 33 is driven across guide rail 34 by suitable driving means such as a belt or the like. The drive means drives carriage 33, and consequently print heads 31a and 31b, in scanning motions across guide rail 34 so as to scan across an unshown printing medium. With this arrangement, print head 31a scans in a left-side portion of the printing medium and has as its printable area a width of 226 mm; whereas print head 31b scans in the right-side portion of the printing medium, and has as its printing area a width of 226 mm.

Capping mechanisms 36a and 36b are respectively provided for the ink jet outlets of each of print heads 31a and 31b. The capping mechanisms 36a and 36b are disposed under platen 35 at the home position of carriage 33 so that each ink ejection nozzle can be capped when in the home position. In addition, capping mechanism 36b is additionally provided with pumping mechanism 37, so as to extract ink from the ink ejection nozzles by suction. Since either of print heads 31a or 31b may be positioned over capping mechanism 36b, it is ordinarily not necessary to provide a separate pumping mechanism 37 for both capping mechanisms.

Wiper 38 is provided adjacent capping mechanism 36b. Wiper 38 moves outward at certain times into the path of the print heads 31a and 31b so as to wipe the ink ejection nozzles of the head as they come in contact therewith.

With the above-described arrangement, a head separation distance of 72 mm between each of heads 31a and 31b corresponds to approximately ¼ of the maximum printable area, which in this case is 298 mm. A central overlap area of 154 mm can be printed on by either of the print heads 31a and 31b. With this arrangement, A-3 size paper (297 mm×420 mm) can be accommodated easily. In addition, A-5 size paper (148 mm by 210 mm) can also be accommodated easily in the central overlap section. In this case, it is possible to replace one of the two print heads 31a and 31b with a print head which uses different kinds of ink, such as a print head which uses ink of lesser density than that of the replaced print head. Such an arrangement provides the ability to print with a greater variety of inks such as is desired when printing near-photographic quality images on A-5 size paper.

Figure 8:
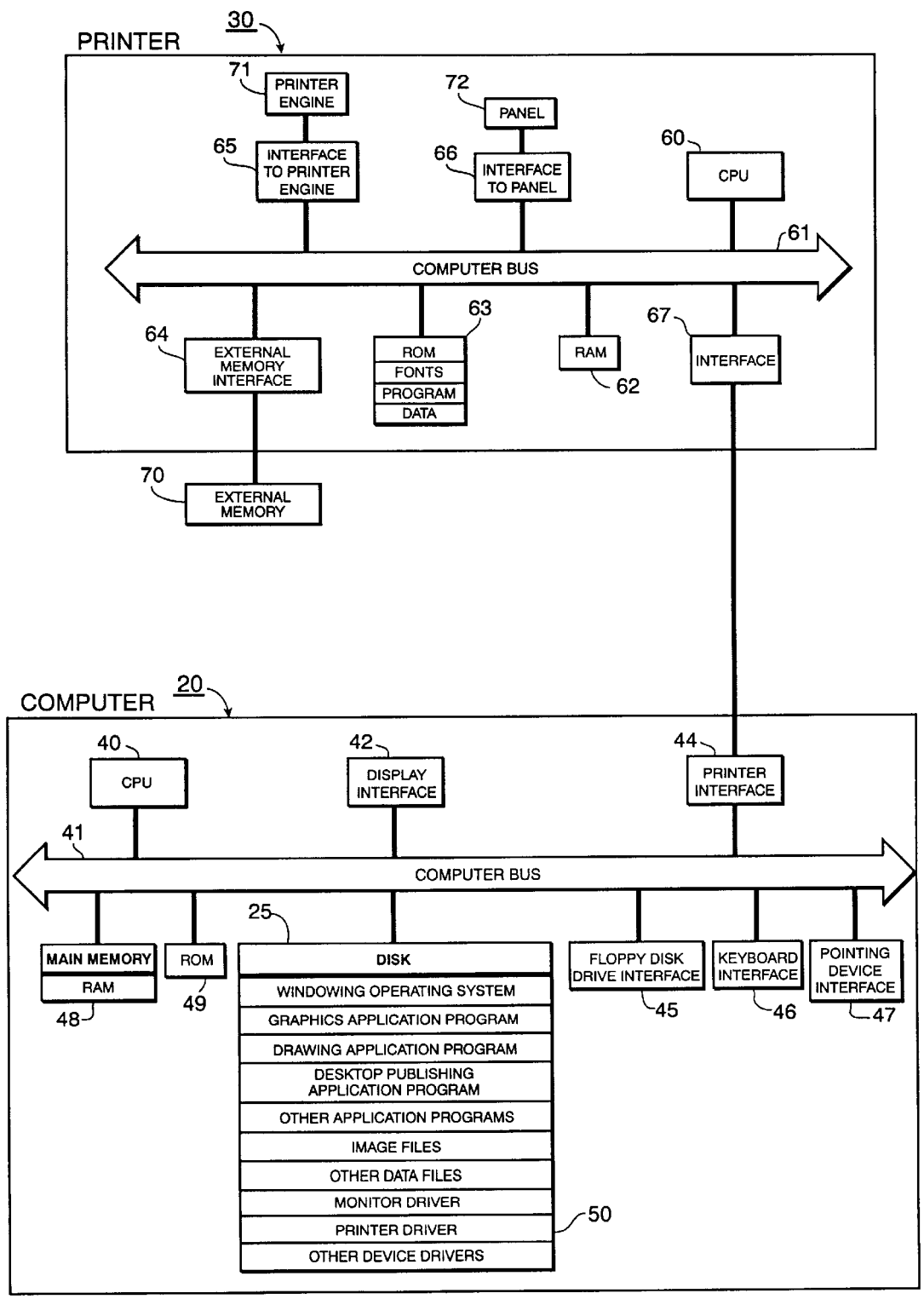
FIG. 8 is a detailed block diagram showing the internal construction of the computer and the printer shown in FIG. 6.

FIG. 8 is a detailed block diagram showing the internal construction of computing equipment 20 and the internal construction of printer 30. As shown in FIG. 8, computing equipment 20 includes a central processing unit (CPU) 40 such as a programmable microprocessor interfaced to computer bus 41. Also interfaced to computer bus 41 is a display interface 42 for interfacing to display 23, a printer interface 44 for interfacing to printer 30, a floppy disk drive interface 45 for interfacing to floppy disk 24, a keyboard interface 46 for interfacing to keyboard 26, and a pointing device 47 interface for interfacing to pointing device 27.

Main memory 48 such as random access memory (RAM) interfaces to computer bus 41 so as to provide CPU 40 with access to memory storage. In particular, when executing stored application program instruction sequences such as those associated with application programs stored on disk 25, CPU 40 loads those application instruction sequences from disk 25 (or whichever other storage media such as media accessed via a network or a floppy disk drive 24) into main memory 48 and executes those stored program instruction sequences out of the main memory.

Main memory 48 also provides for a print data buffer used by a print driver according to the invention, as described more fully hereinbelow. It should also be recognized that standard disk-swapping techniques available under the windowing operating system allow segments of memory, including the aforementioned print data buffer, to be swapped on and off of disk 25.

Read only memory (ROM) 49 is provided for storing invariant instruction sequences, such as start-up instruction sequences or basic input/output operating system (BIOS) sequences for operation of keyboard 26.

As shown in FIG. 8, and as previously mentioned, fixed disk 25 stores program instruction sequences for the windowing operating system and for various application programs such as graphics application programs, drawing application programs, desktop publishing application programs, and the like. In addition, fixed disk 25 also stores color image files such as might be displayed on monitor 23 or printed on printer 30 under control of a designated application program. Fixed disk 25 also stores a color monitor driver which controls how multilevel RGB color primary values are provided to display interface 42, and a print driver 50 which is a print driver for controlling how CMYK color component values are derived from RGB color primary values and provided to printer interface 44 for print out by printer 30, all according to the invention.

Other device drivers are also stored on fixed disk 25, for providing appropriate signals to various devices, such as network devices, facsimile devices, and the like, connected in computing equipment 20.

Ordinarily, application programs and drivers stored on disk 25 need first to be installed by the user onto disk 25 from other computer readable media on which those programs and drivers are initially stored. For example, it is customary for a user to purchase a floppy disk or other computer readable media such as CD-ROM on which a copy of a printer driver according to the invention is stored. The user would then install the printer driver 50 onto fixed disk 25 through well-known techniques by which the printer driver is copied into disk 25. At the same time, it is also possible for the user, via an unshown modem interface or via an unshown network, to download a printer driver according to the invention, such as by downloading from a file server or from a computerized bulletin board.

Reverting to FIG. 8, printer 30 includes a CPU 60, such as a V853 single chip microprocessor, connected to computer bus 61. Also connected to computer bus 61 are RAM 62, ROM 63, external memory interface 64, interface 65 to a print engine, interface 66 to a panel, and interface 67 to computer 20. RAM 62 is comprised of working storage for printer 30, and in particular includes a print data buffer area as described more fully below. ROM 63 is comprised by a font ROM for storing font data, a program ROM to store program instruction sequences used to control printer 30, and invariant data such as printer model number and the like. External memory interface 64 interfaces to external memory cartridges such as cartridge 70 that provide additional fonts for printer 30, or provide additional random access memory. Interface 65 interfaces to a print engine 71 including interfaces to printer heads illustrated in FIG. 7, an interface to the drive means for carriage 33, an interface to capping mechanisms 36a and 36b and to pump 37, and other unshown interfaces such as interfaces to document feed sections and interfaces to printer nozzle controls. Interface 66 to a panel includes an interface to panel 72, comprised, for example, by an LCD display for displaying status of the printer, LEDs for indicating on-line and off-line or error conditions, and various control buttons for setting and otherwise interfacing with printer 30. Interface 67 includes a complementary interface to printer interface 44 of computer 20.

Although FIG. 8 illustrates the individual components of printer 30 as separate and distinct from one another, it is preferable that at least some of those components are combined. For example, it is preferable to combine external memory interface 64, interface 65 to the print engine, interface 66 to the panel, and interface 67, all into a single gate array. Most preferably, the aforementioned gate array is further combined with CPU 60, RAM 62 and ROM 63 into a so-called four-in-one chip, which eliminates the need to provide leads to a separate computer bus and lessens the number of interconnections needed so as to fabricate a control portion for printer 30.

Figure 9:
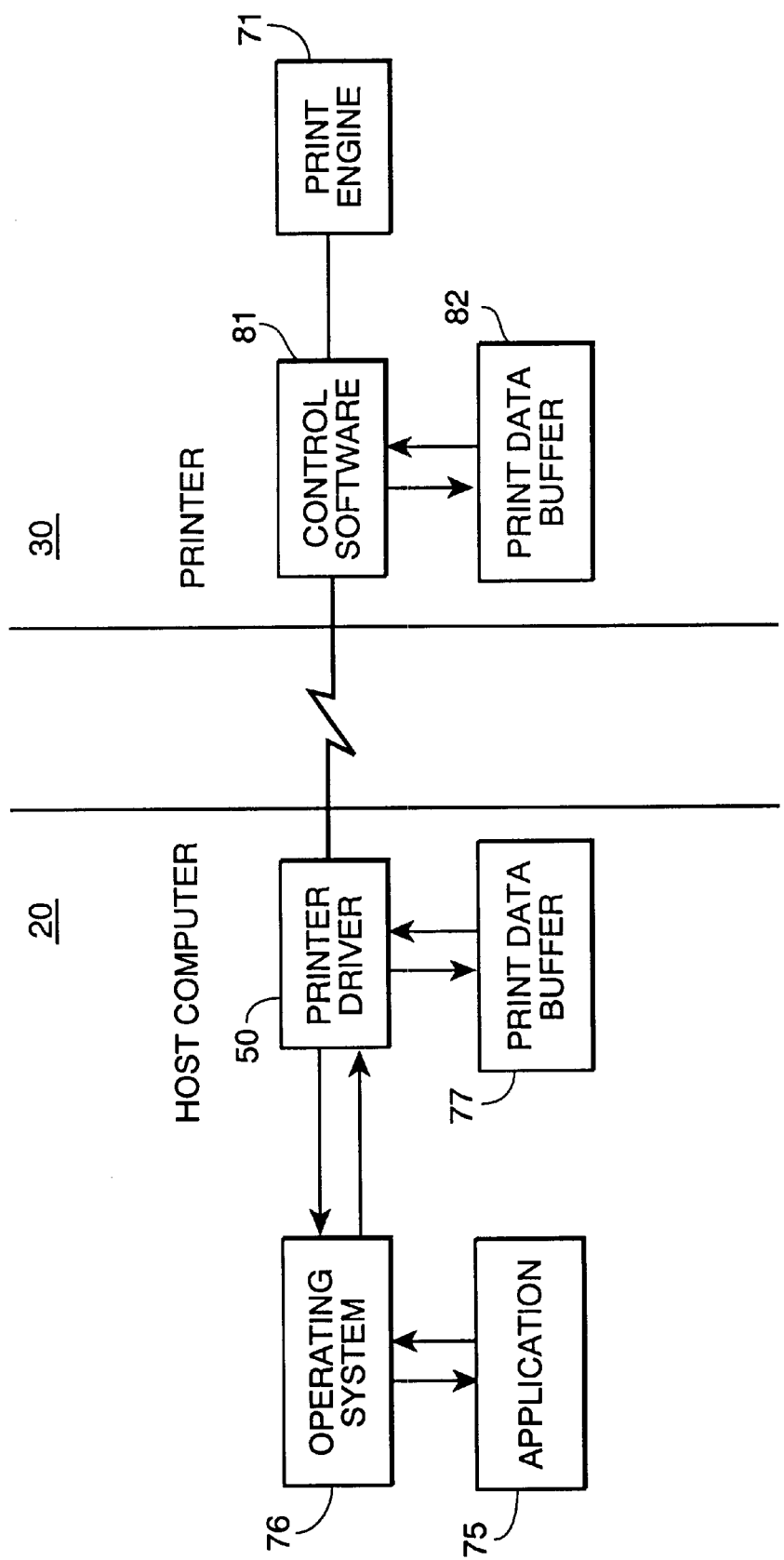
FIG. 9 is a functional block diagram showing functional interconnection of the computer and the printer shown in FIG. 6.

FIG. 9 is a high-level functional block diagram illustrating how computer 20 interacts with computer 30 in the practice of the invention. As shown in FIG. 9, in response to a printing instruction issued from application program 75, such as an image processing application stored on disk 25, the windowing operating system 76 issues graphics device interface calls to printer driver 50. In accordance with the invention, printer driver 50 derives print data corresponding to the print instruction from application 75, and stores the print data in print data buffer 77. As previously mentioned, print data buffer 77 may reside in RAM 48 or in disk 25, or through disk swapping operations of operating system 76 may initially be stored in RAM 48 and swapped in and out of disk 50. Thereafter, and again in accordance with the invention, print driver 50 obtains print data from print data buffer 77 and transmits the print data through interfaces 44 and 67 to printer 30 for printout thereby.

At the receiving end, printer 30 through use of control software 81 comprised by the program stored in ROM 63 receives the print data from print driver 50 and stores it in a print data buffer 82. Print data buffer 82 resides in RAM 62. Thereafter, control software 81 retrieves the stored print data from print data buffer 82, processes it as described below such as by decompression, and transmits it to print engine 71 for printout thereby.

These operations are described in greater detail in the following representative embodiments of the invention.

First Embodiment

Figure 10:
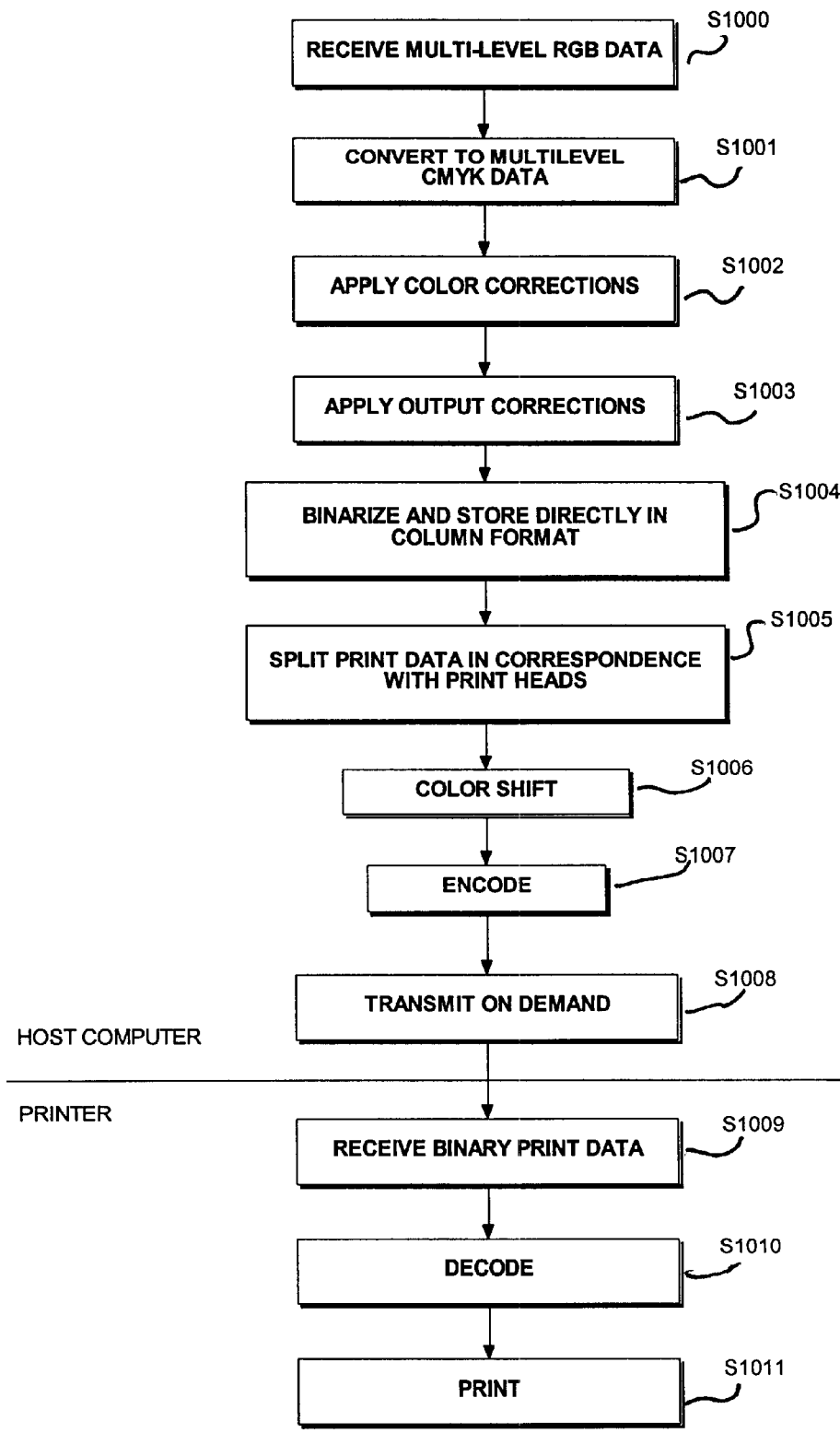
FIG. 10 is a flow diagram for explaining the process steps and code for a print driver according to a first embodiment of the invention.

FIG. 10 is a flow diagram showing a first embodiment of the invention. The process steps shown in FIG. 10 are stored as code for execution by a CPU with the process steps in the upper portion of FIG. 10 being stored as code in print driver 50 for execution by CPU 40, and with the process steps shown in the lower portion in FIG. 10 being stored as code in ROM 63 for execution by CPU 60.

Generally speaking, the process steps shown in FIG. 10 are a print driver executable in a host computer so as to output binary print data corresponding to a raster image to a printer that has a print head with vertically-oriented print elements and that forms images in a band on a recording medium. Multi-level data for successive pixels of the raster image are accessed, and the multi-level data for each successive pixel is binarized into binary print data corresponding to a print element on the print head. The binarized data for each pixel is stored directly in column format, preferably without the intermediary of storage in horizontal raster format.

In the arrangement shown in FIG. 10, the printer is a color printer whose vertically-oriented print elements are arranged into plural groups respectively corresponding to each of plural subtractive color components, such as CMYK color components, and multi-level data is provided for each of plural additive color components, such as RGB color components. Under these circumstances, binarization binarizes each successive pixel of multi-level data into binary data for each of the plural subtractive color components. If the plural groups of vertically-oriented print elements are offset with respect to each color component, then the binarized print data is preferably shifted so as to account for vertical offset between each group of print elements. The binarized (and shifted) binary data in column format is then communicated from the host computer over an interface such as a bi-directional interface to the color printer for printout thereby.

In more detail in step S1000, print driver 50 receives RGB print data for printout by printer 30. The RGB print data is multi-level image data for each of plural R, G and B color planes, and generally is received through graphic device interface commands from a windowing graphical device interface (GDI) environment from operating system 76. In step S1001, the multilevel RGB data is converted to multi-level CMYK through any suitable processing such as matrix multiplication followed by undercolor removal, as follows:

$$\begin{bmatrix} C \\ M \\ Y \end{bmatrix} = \begin{bmatrix} \alpha_1 + \alpha_2 & 1 - \alpha_1 & 1 - \alpha_2 \\ 1 - \beta_1 & \beta_1 + \beta_2 & 1 - \beta_2 \\ 1 - \gamma_1 & 1 - \gamma_2 & \gamma_1 + \gamma_2 \end{bmatrix} \begin{bmatrix} R \\ G \\ B \end{bmatrix}$$

and:
K=min (C,M,Y)
C=C−K
M=M−K
Y=Y−K

In step S1002, color corrections are applied to the CMYK multilevel data. Color corrections applied in step S1002 generally relate to tailoring of the multi-level image data to match color output characteristics of color printer 30. Thus, for example, color correction in step S1002 accounts for differences between the color characteristics of the actual dyes used in color printer 30 as opposed to idealized dyes, and further accounts for differences in color perception such as correction in the blue/purple region for the so-called Abney effect.

Step S1003 applies output corrections to the CMYK multilevel data. Output corrections account for output characteristics of color printer 30, such as misalignment between respective print heads 31a and 31b, differences in print densities of those print heads, density blending between the overlap area of the print heads, and the like. Misalignments between print heads 31a and 31b are corrected as described in U.S. application Ser. No. 08/901,560, now U.S. Pat. No. 6,089,766, entitled "An Auto-Alignment System for A Printing Device", the contents of which are incorporated by reference as if set forth in full herein. Generally speaking, to correct for misalignments such as a vertical offset between the printing positions of heads 31a and 31b, an unshown optical sensor in printer 30 senses the actual printed output of predetermined print patterns in the overlap area of the two print heads, so as to drive a numerical value representation of the offset/misalignment between the two print heads. The print position of the CMYK multilevel data is then changed based on the numerical offset value to as to ensure that dots are printed by each head at positions that compensate for the misalignment.

Preferably, steps like S1002 and S1003, which apply corrections to the CMYK multilevel data in preparation for printout, perform corrections on multilevel data rather than on binary data. This is because of the finer degree of control available over multi-level image data as opposed to binary image data. For example, density corrections and color shift corrections are far easier to apply to multi-level image data than to binary image data.

Step S1004 binarizes the corrected CMYK multilevel data and stores the binarized print data directly in column format. This process is illustrated in more detail in FIG. 11.

Figure 11:
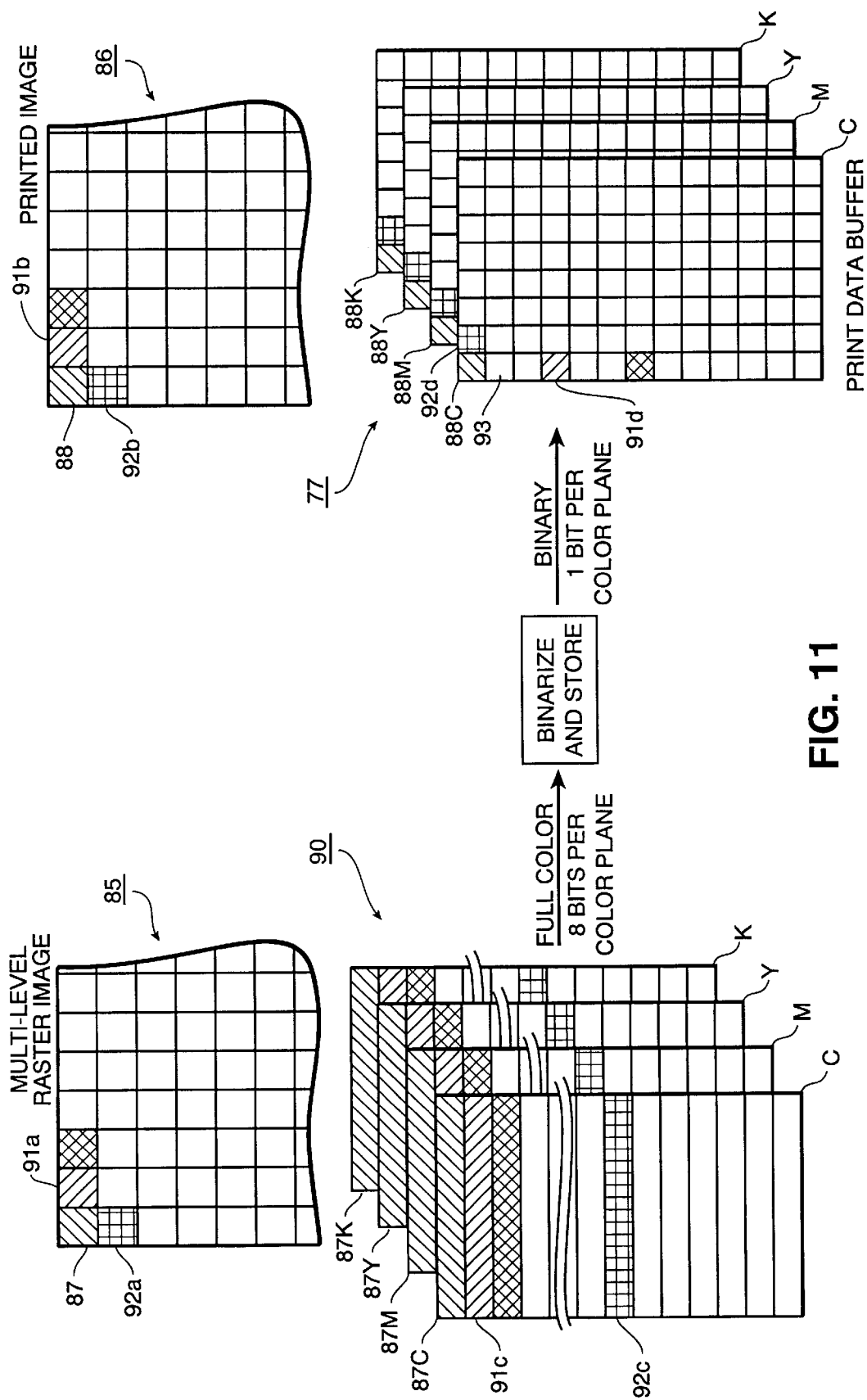
FIG. 11 is a view for explaining storage of column format data.

Shown in FIG. 11 is a multi-level raster image 85 for which it is desired to obtain a printed image 86. Raster image 85 is comprised of individual pixels such as pixel 87, each pixel having a counterpart in the printed image such as pixel 88. The reason that image 85 is referred to as a raster image is that image data for each successive pixel is stored in raster format as illustrated at 90 which represents a memory storing multi-level data for each pixel in raster image 85. As shown at 90, for each pixel in raster image 85, one memory location is used for each of four multilevel color planes, i.e., one memory location for the cyan multilevel color plane, one memory location for the magenta multilevel color plane, one memory location for the yellow multilevel color plane, and one memory location for the black multilevel color plane. The multi-level image data in this case is 8-bits per plane, meaning that 8 bits (corresponding to one byte) are needed to store color information for each color plane for each pixel. Thus, for pixel 87, an 8-bit byte 87C is required for the cyan color plane, and 8-bit byte 87M is required for the magenta color plane, an 8-bit byte 87Y is required for the yellow color plane, and an 8-bit byte 87K is required for the black color plane. The multi-level image data is stored successively, in raster image format, as indicated by the coded hatch patterns.

Binarizing according to step S1004 proceeds by accepting full color multi-level image data for each successive pixel and applying binarization processing so as to obtain one binary bit for each color component of printer 30. Since in this case printer 30 prints in four color components (cyan, magenta, yellow and black), four binary bits are obtained, one for each color plane. Thus, for pixel 88 in printed image 86, one binary bit 88c is provided for the cyan color plane, one binary bit 88m is provided for the magenta color plane, one binary bit 88y is provided for the yellow color plane, and one binary bit 88k is provided for the black color plane. Binarization can proceed by any desired binarization method, such as color dithering, error diffusion, stochastic processing, and the like, and can be enhanced as desired through edge enhancement, smoothing, etc.

According to the invention, binarized print data is stored in print data buffer 77 in column format. Specifically, since print data is binary data, eight pixels worth of print data can be stored in each 8-bit byte of print data buffer 77 (for each color plane). The data is not stored in raster format, however, but is stored in column format in correspondence to the vertical orientation of the print elements of the print head. Since in this case the print elements are arranged in groups of 24 nozzles for each color component, then 24=3×8, or 3 bytes are needed to store one column of print data in print data buffer 77. Thus, for pixel 87 in raster image 85, which is printed at corresponding pixel location 88 in printed image 86, binary print data is stored at location 88c (for the cyan component) which is the first bit in the first byte of print data buffer 77. However, for pixel 91a which is printed at location 91b and stored in raster format at location 91c, the corresponding binary print information is not stored in the next successive memory location in print data buffer 77, but is stored in a location shifted three bytes down in correspondence to the number of bytes needed to print a column of print data. Thus, print data for pixel 91b is stored at location 91d, which is the first byte in the third-down memory location of print data buffer 77. In like manner, binarized print data is directly stored in print data buffer 77 as shown in the cross-hatch coding. Thus, for example, for pixel 92a which is the next vertically down pixel from pixel 87, which is printed at location 92b in printed image 86, and which is stored at location 92c in raster image format (location 92c may be located as many as 2,880 memory locations below the memory location for pixel 87), the corresponding binary print data is stored at location 92d which is the second bit in the first byte of print data buffer 77.

Although FIG. 11 depicts column data organized as 24 pixel columns (i.e., three 8-bit bytes corresponding to 3×8= 24 nozzles on the print head), other organizations of column data are also possible. For example, it is possible to organize the column data into 8 pixel columns. In this case, whereas the location 92d for print data for pixel 92b is unaffected, print data for pixel 91b would be stored at a location which is in the first bit of the very next down location of print data buffer 77 (i.e., at pixel location 93).

Thus, step S1004 binarizes multi-level image data into binary print data and stores the binary print data directly in column format. Preferably, the binary print data is stored directly in column format without the intermediary of storage in horizontal raster format. By virtue of this processing, there is no need for subsequent re-orientation of raster image format data into the needed column format data.

Figure 12:
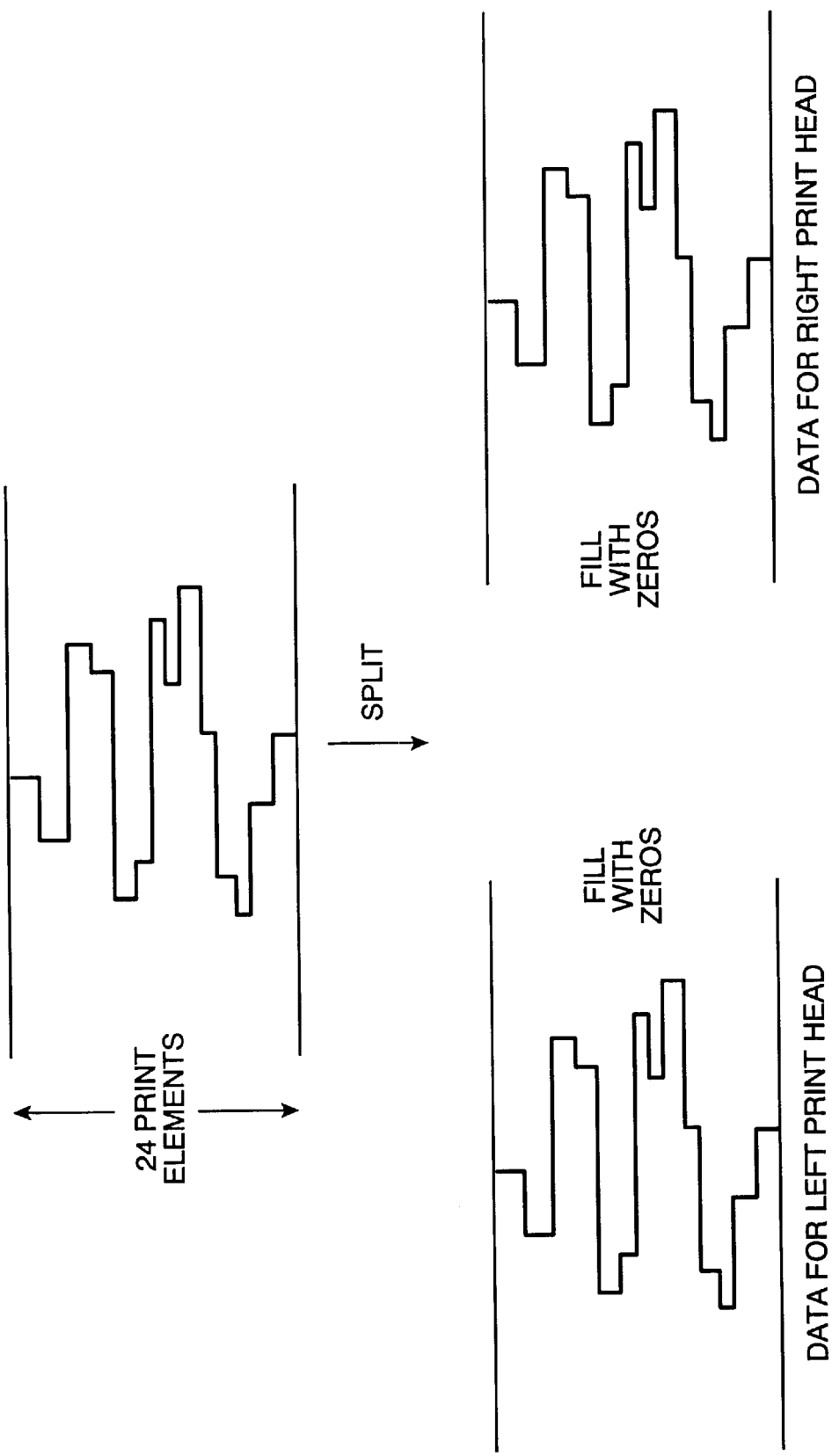
FIG. 12 is a view for explaining how to split print data between each of a pair of print heads.

Reverting to FIG. 10, step S1005 splits the binary print data in correspondence to which binary print data will be allocated to which of print heads 31a and 31b. Specifically, since print head 31a prints primarily left-side print data, and print head 31b prints primarily right-side print data, the binary print data stored in print buffer 77 is split so as to allocate which data is printed by which head. Preferably, and so as to avoid an easily visible vertical line if the print data were split exactly along a vertical line, the print data is split in a staggered stepwise pattern so that there is no easily discernable vertical line indicating printing by print head 31a as opposed to print head 31b. A typical pattern, which is distributed vertically across 24 print nozzles in each band, is illustrated in FIG. 12. It is noted that after print data is split, the non-printed portions for each print head are filled with binary zeroes to prevent printing by that print head.

Figure 4:
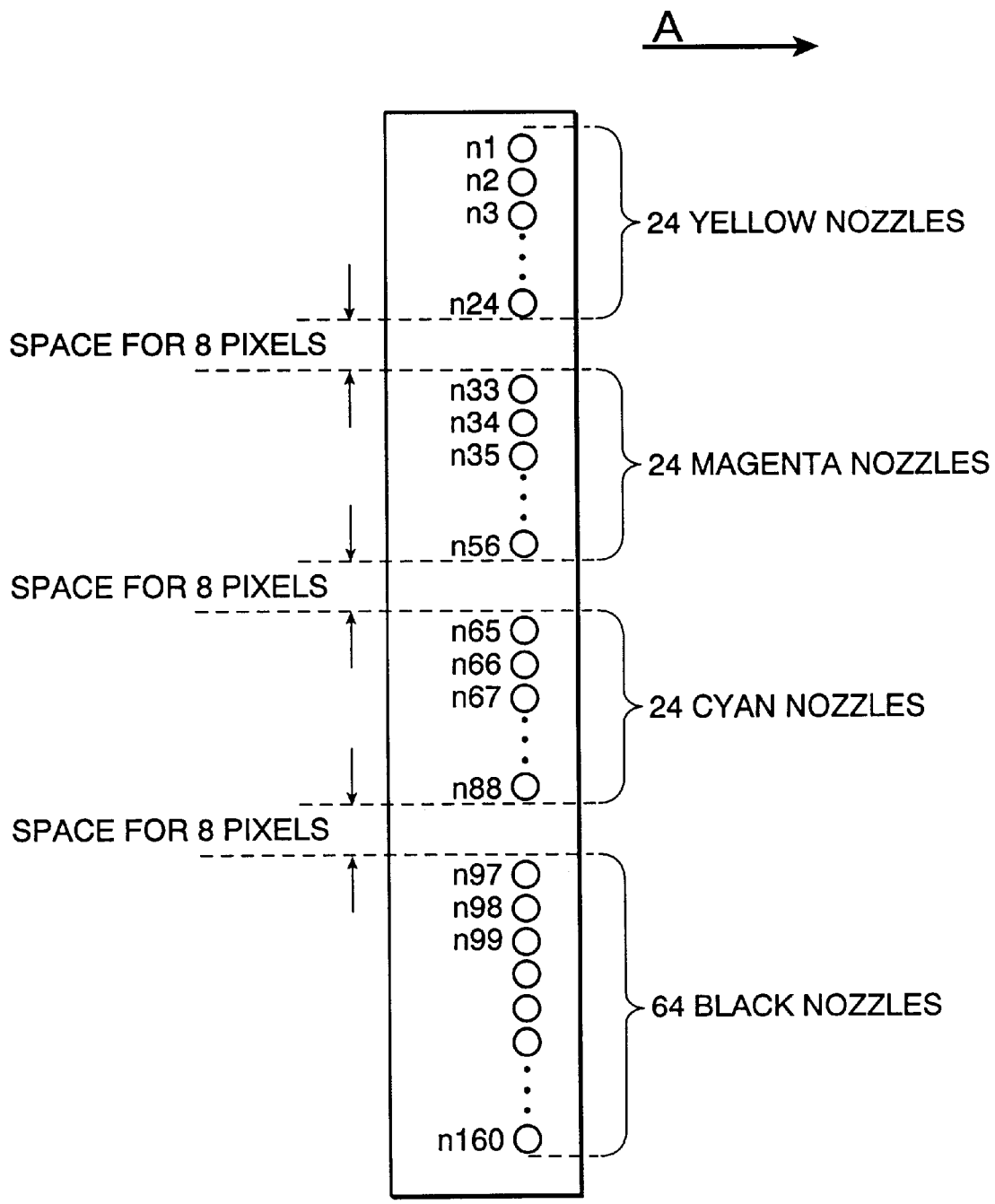
FIG. 4 is a view showing print element (or nozzle) arrangement in a print head.
Figure 5:
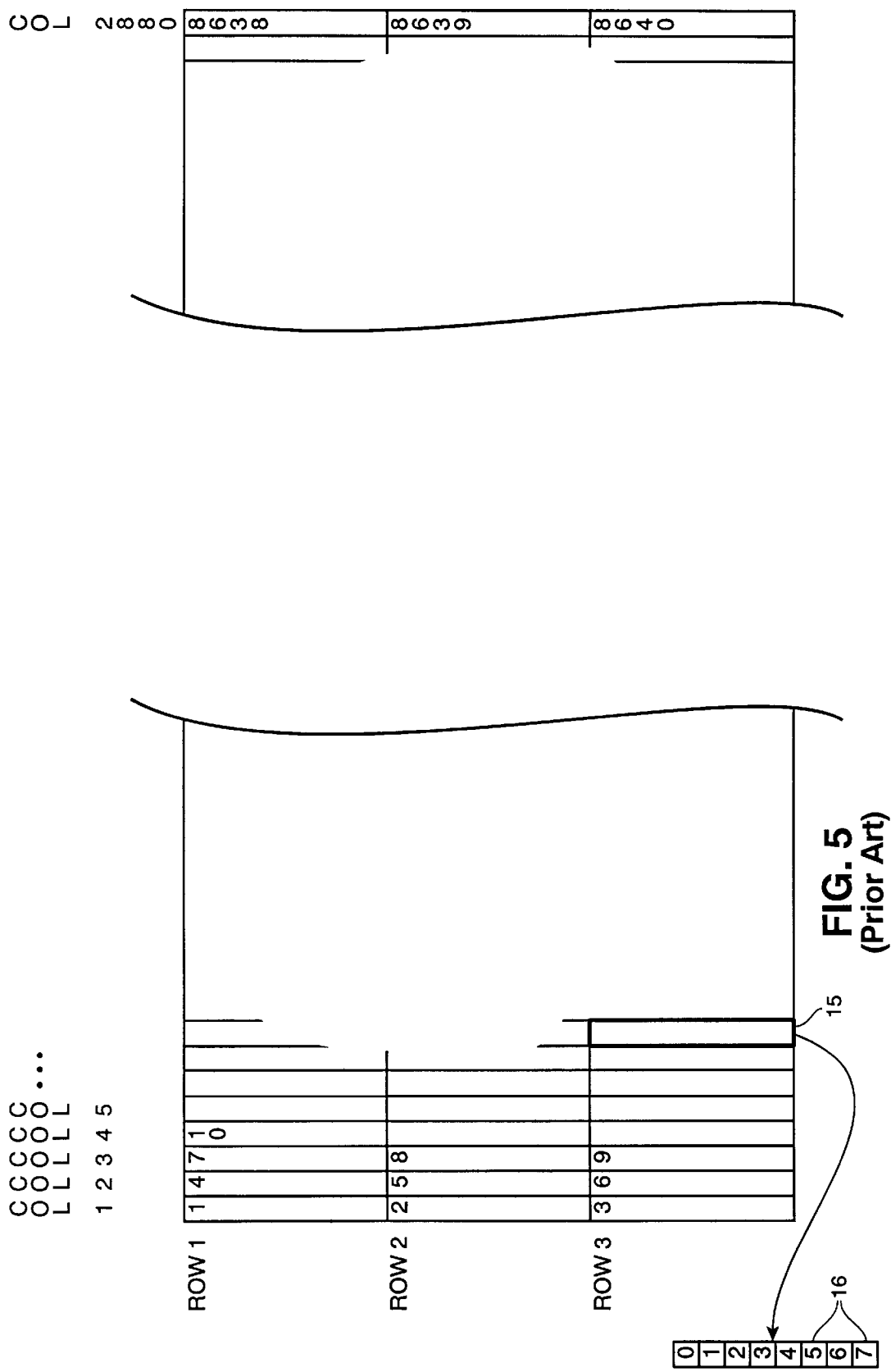
FIG. 5 is a view illustrating column format for storing print data.

Reverting to FIG. 10, step S1006 color-shifts print data in print buffer 77, so as to account for vertical offset between each group of print elements. Thus, for example, and referring to FIG. 4, since it is known that printout for the magenta nozzles commences at a location that is 32 pixels below the location of yellow nozzles, magenta binary print data is shifted downwardly by 32 pixels so as to account for this shift. Color shifting is described in detail in Japanese published Application Laid-Open Nos. 08-142349 (Jun. 4, 1996), 08-150736 (Jun. 11, 1996), 08-150737 (Jun. 11, 1996) and 08-157035 (Jun. 11, 1996), and in U.S. application Ser. No. 08/557,568, filed Nov. 14, 1995, "Recording System For Transferring Offset Data To Be Recorded", the contents of all of which are incorporated herein by reference as if set forth here in full.

Flow then advances to step S1007 in which the binarized print data is encoded for transmission to printer 30. Specifically, since print data for large sections of a printed image are often redundant, it may be possible to transmit the data more efficiently if the data were encoded. Appropriate lossless encoding, such as run length encoding or the like, may be used.

Step S1008 transmits the encoded data. Preferably, the encoded data is transmitted on demand from printer 30 in relation to how far along printer 30 has completed previous printing tasks. In this case, a bi-directional interface with printer 30 is preferable so that printer 30 can request only so much of print data as it is able to use immediately. This arrangement permits even further reductions in the size of print data buffer 82 within printer 30.

Advancing to step S1009, and on the printer side, the print data is received under software control of control software 81, and stored in print data buffer 82. If encoded, the print data is decoded in step S1010, whereafter control software 81 retrieves the decoded print data from print data buffer 82 and causes print engine 71 to print it.

Figure 13:
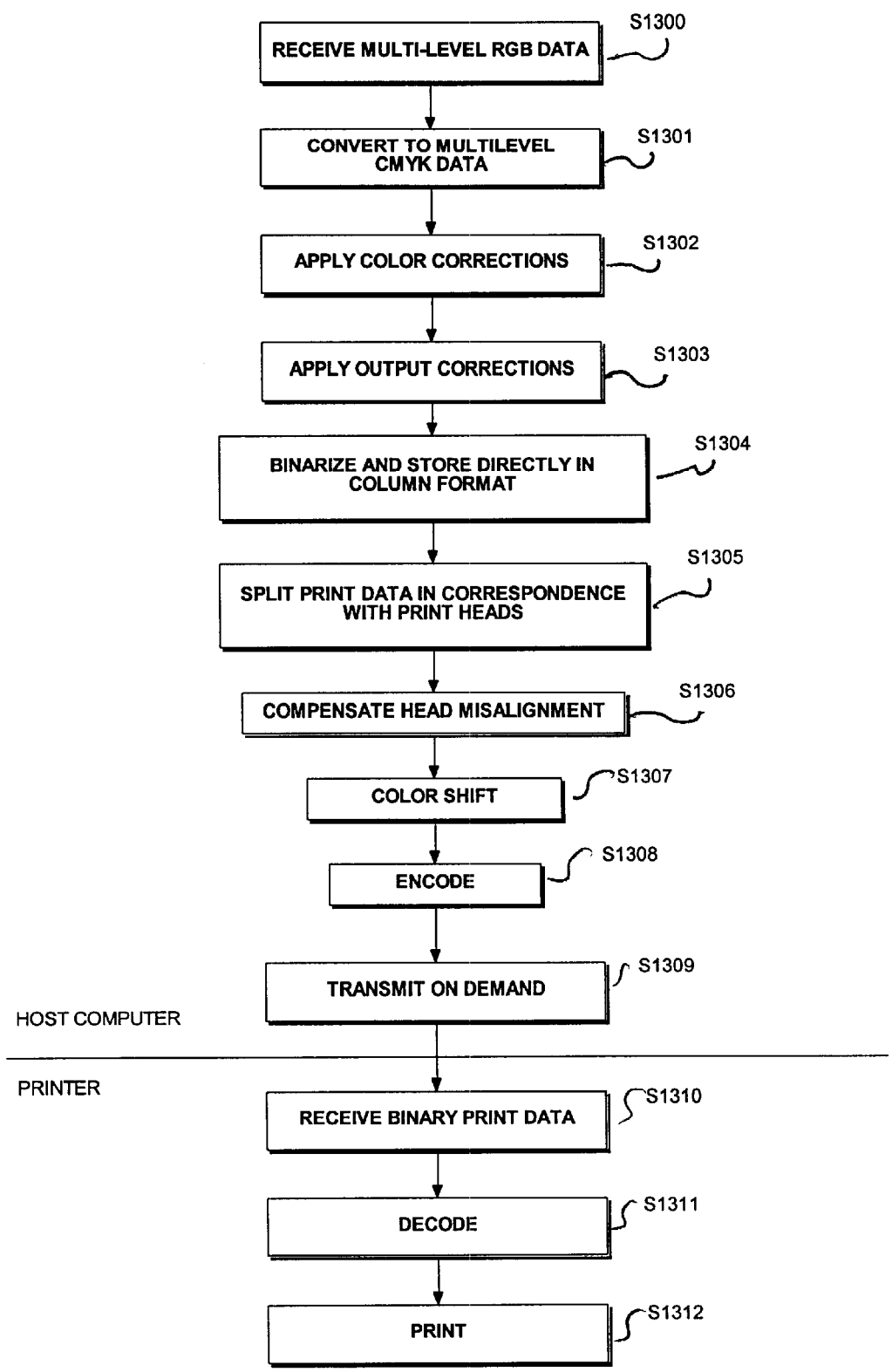
FIGS. 13 and 14 are views for explaining a modification to the first embodiment, which uses binary point data to compensate head misalignment.

FIG. 13 is a flow diagram illustrating a modification of the first embodiment, in which compensation for misalignment between print head 31a and print head 31b is performed on binary print data rather than on multi-level data. In more detail, and as mentioned previously in connection with steps S1002 and S1003, it is generally preferable to apply color corrections and output corrections (which in the first embodiment includes corrections for misalignment between the two print heads) on multi-level data rather than on binary data because of the finer degree of control available over multi-level data as opposed to binary data. However, compensation for misalignment between print heads 31a and 31b essentially requires a shift of binary print data for one print head relative to another. Accordingly, and particularly since print data is already stored in column format, it is natural to modify the first embodiment so that compensation for misalignment between the two print heads is performed on binary data.

Referring to FIG. 13, steps S1300 through S1305 are identical to the corresponding steps in FIG. 10, and cause the print driver to receive multi-level RGB data, convert to multi-level CMYK data, apply color corrections, apply output corrections (which in this figure do not include compensation for head misalignment), binarize and store the CMYK print data in column format, and split the print data in correspondence with respective print heads 31a and 31b.

Flow then advances to step S1306 which compensates for head misalignment. In more detail, as described in the aforementioned application entitled "Printer Driver With An Auto-Alignment Function", a numerical value representative of the offset between the two print heads 31a and 31b is derived. Based on the numerical offset value, binary data for one print head is shifted upwardly or downwardly relative to the other print head. This operation is depicted in FIG. 14.

Figure 14:
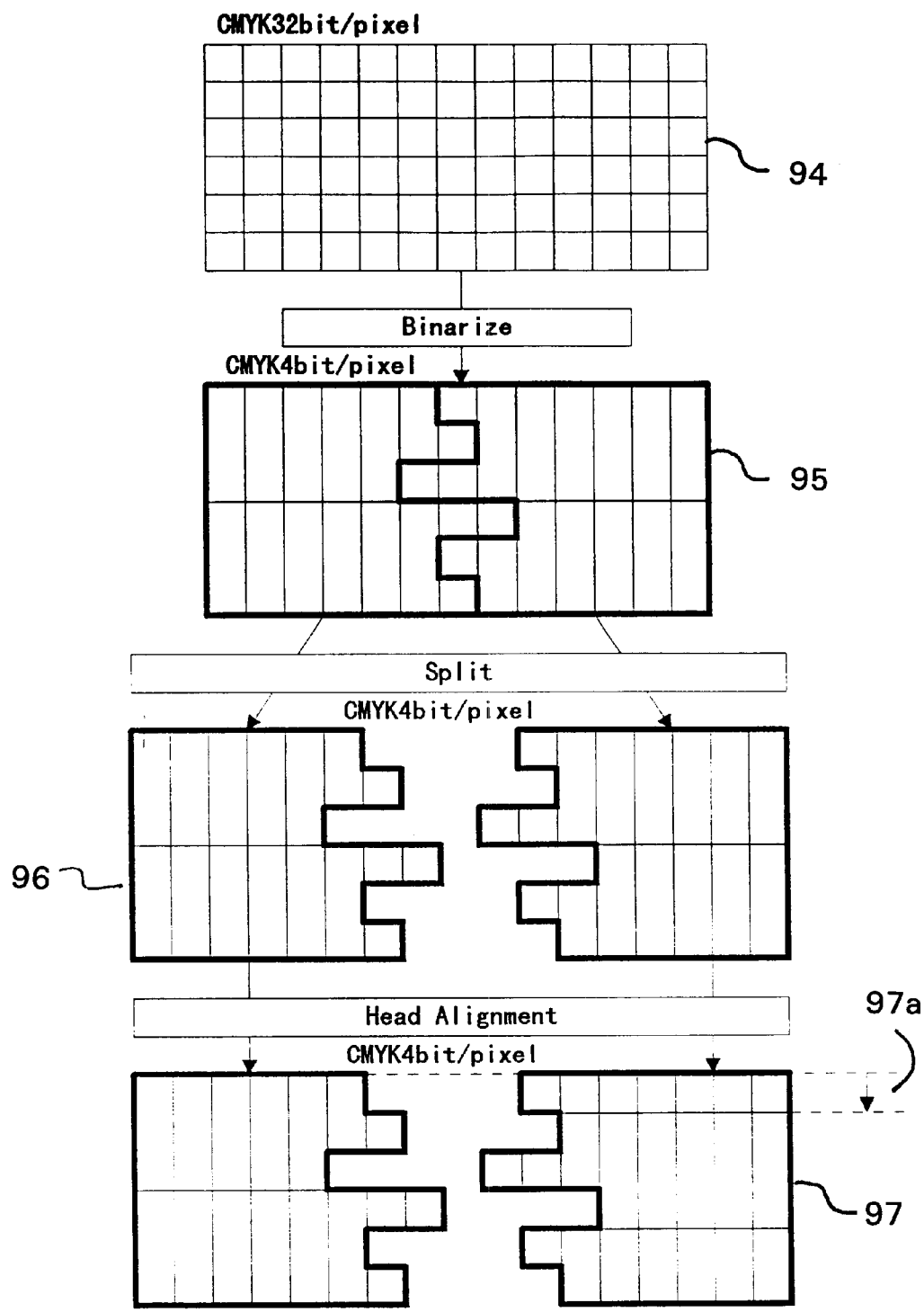

Referring to FIG. 14, 32 bit CMYK multi-level image data 94, which has been color corrected and output corrected, is subjected to binarization and stored directly in column format (step S1304) as illustrated at 95. Thus, 95 refers to a memory buffer in which CMYK binary print data is stored in column format, with one binary bit per pixel for each of the C, M, Y and K color planes. Thereafter, the binarized data at 95 is split (step S1305) in correspondence with which data is printed by each of print heads 31a and 31b, as illustrated at 96. Thus, 96 refers to a pair of memory buffers in which the column-oriented CMYK binary print data is split between data to be printed by print head 31a and data to be printed by print head 31b. Thereafter, and in accordance with step S1306, one of the pair of buffers shown at 96 is shifted upwardly or downwardly so as to compensate for head misalignment. In FIG. 14, buffer 97 has been shifted downwardly by distance 97a which corresponds to the numerical offset value so as to compensate for head misalignment. Such a shift is facilitated by the column-oriented format in which the CMYK binary print data is already stored.

Reverting to FIG. 13, flow thereafter advances to steps S1307 through S1312, which are identical to steps S1007 through S1011, and which cause print data to be shifted in accordance with a vertical offset between color components on the print heads, the print data to be encoded and transmitted on demand, the print data to be received by printer 30, decoded and printed.

Second Embodiment

One way that the second embodiment differs from the first embodiment is that binary print data for the black component, which has relatively more print elements on the print head than the other color components, is shifted at intervals so as to ensure that some of the black print elements are not overused at the expense of other black print elements which are underused. As explained more fully below, long use of a print element will gradually cause a change in the print density obtained from that print element. By shifting the black color component data, use of the black print elements is distributed among all print elements, thereby ensuring that the gradual change in print density is uniform among all black print elements. This ensures that when black data alone is printed, during which time all print elements are used, there will not be a noticeable difference in print density between some print elements and other print elements.

Figure 15:
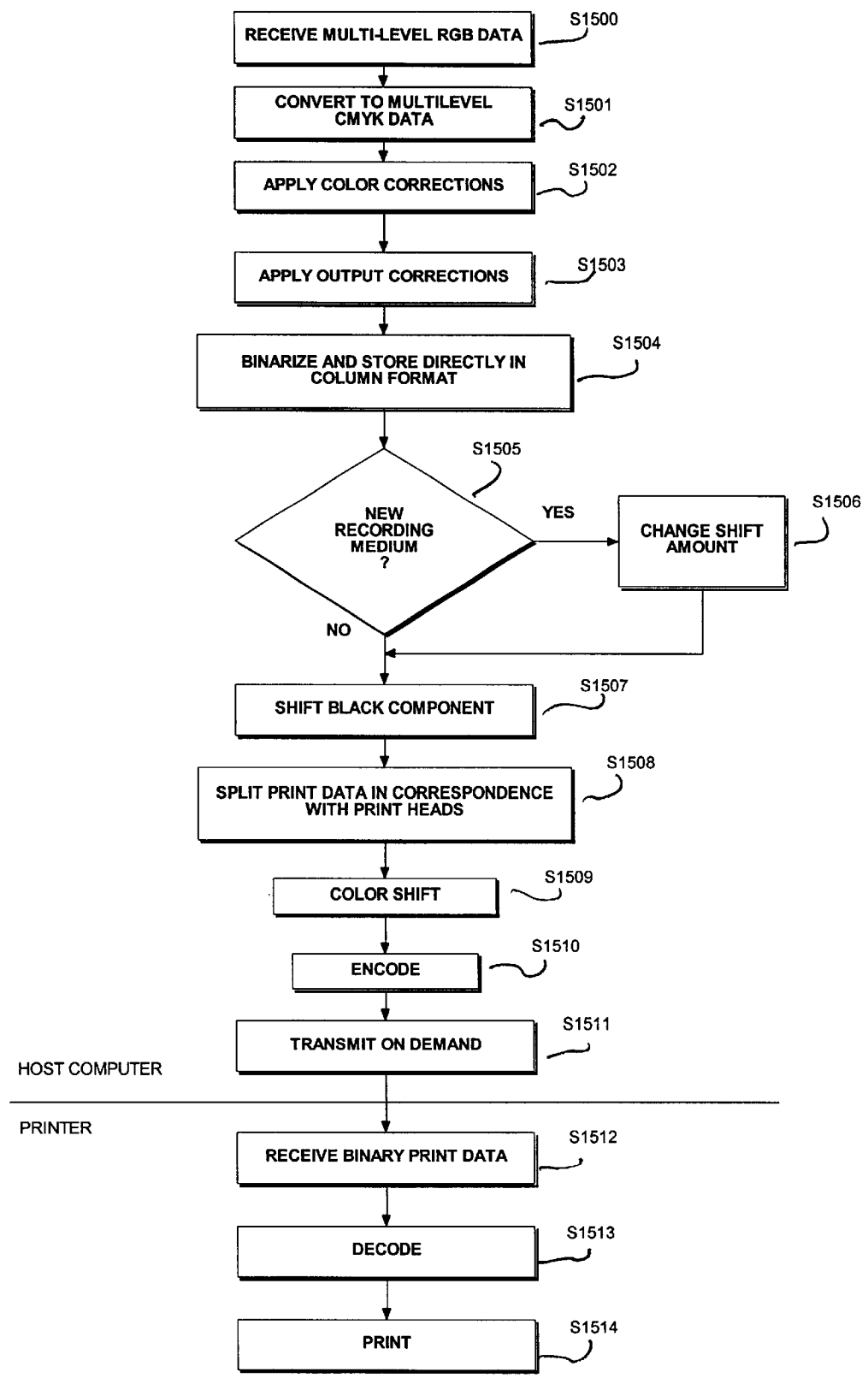
FIG. 15 is a flow diagram for explaining the process steps and code for a print driver according to a second embodiment of the invention.

FIG. 15 is a flow diagram showing process steps illustrating the second embodiment. Generally speaking, the process steps shown in FIG. 15 are a printer driver executable in a host computer so as to output binary print data corresponding to a raster image to a printer that has a print head with vertically-oriented print elements and that forms images in a band on a recording medium. The vertically-oriented print elements are arranged in plural groups respectively corresponding to each of plural respective color components including a black color component, and the print head has relatively more print elements for the black color component than for the other color components. Multi-level data for successive pixels of the raster image are accessed, and the multi-level data for each successive pixel is binarized into binary print data corresponding to a print element on the print head. The binarized print data is stored for each pixel directly in column format, and the binary print data for the black color component is shifted so as to select different black print elements for successive recording mediums.

Specifically, referring to FIG. 15, steps S1500 through S1504 are identical to the corresponding steps in FIG. 10, and cause the print driver to receive multilevel RGB print data, convert to multilevel CMYK data, apply color corrections, apply output corrections, and binarize and store the CMYK print data in column format.

Steps S1505 through S1507 determine a shift amount for the black print data and apply the black shift amount to the data so as to cause different black print elements to be selected for successive recording operations. In the embodiment illustrated in FIG. 15, a different shift amount is selected for each sheet of recording medium, and the shift amount is incremented by the same amount for each different recording medium. Thus, a shift amount which initially is set to zero for a first recording medium is incremented by eight pixels for each successive recording medium, thereby causing different ones of black print elements to be selected for each successive recording medium.

In more detail, step S1505 determines whether a printing operation is occurring on a new recording medium. If a new recording medium is being printed, then flow branches to step S1506 which changes the shift amount by incrementing it by eight pixels. In either case, flow advances to step S1507 in which the black component is shifted by the currently-selected amount.

Figure 16:
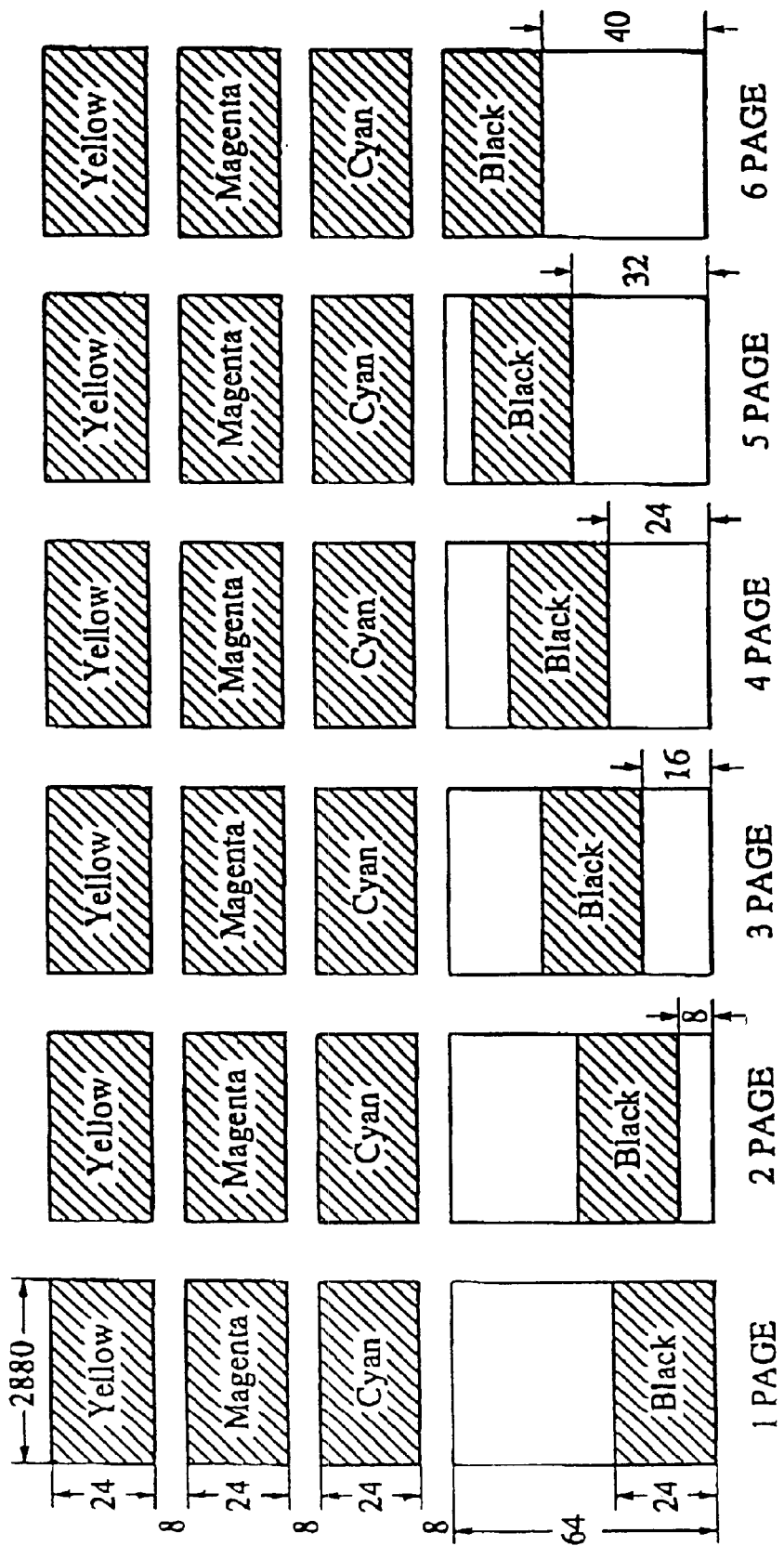
FIGS. 16(a)–16(f) are views for explaining shift of print data for print elements of a black color component.

FIGS. 16(a) through 16(f) illustrate this process diagrammatically. As illustrated in these figures, each of print heads 31a and 31b has 24 print elements for each of the yellow, magenta and cyan color components, and 64 print elements for the black color component. A gap corresponding to eight print elements is formed between each component. For a first page in which the shift amount is zero, printing occurs with all 24 print elements for yellow, magenta and cyan, and with the bottom-most 24 print elements of the black color component, as illustrated in FIG. 16(a). For a second page, and as illustrated FIG. 16(b), the shift amount for the black component print data is increased by eight, thereby causing printing to be effected with all 24 nozzles of the yellow, magenta and cyan print elements, but with nozzle numbers 9 through 33 of the black color component. Like increments are applied for each successive page so as to cause different black print elements to be selected for each successive recording medium. Thereafter, the process repeats.

By virtue of the foregoing arrangement, all 64 print element of the black color component are used even when forming color images. Thus, the frequency of use of the black print elements is made more uniform, thereby ensuring that the change in optical print density of the black color component is also uniform.

Flow thereafter advances to steps S1508 through S1514, which are identical to steps S1005 through S1011, and which cause print data to be split in correspondence with respective print heads, print data to be shifted in accordance with a vertical offset between color components on the print heads, the print data to be encoded and transmitted on demand, the print data to be received by printer 30, decoded and printed.

Third Embodiment

One way that the third embodiment differs from the first two is that boundaries at black regions of the image are detected and the image data is changed so as to reduce bleeding between the black region and other regions at the boundary.

Specifically, in an effort to increase the contrast of the black ink, the black ink is an evaporation type ink which does not penetrate the recording medium deeply. On the other hand, since there is no need to increase the contrast of cyan, magenta and yellow inks, these are of a penetration type which penetrate deeply into the recording medium. At least in part because of this difference in the inks, bleeding can occur when a black region is adjacent to a cyan, yellow or magenta region, whereby the black ink bleeds across the boundary of its region into the surrounding region. This understandably results in an unsatisfactory image.

Figure 17:
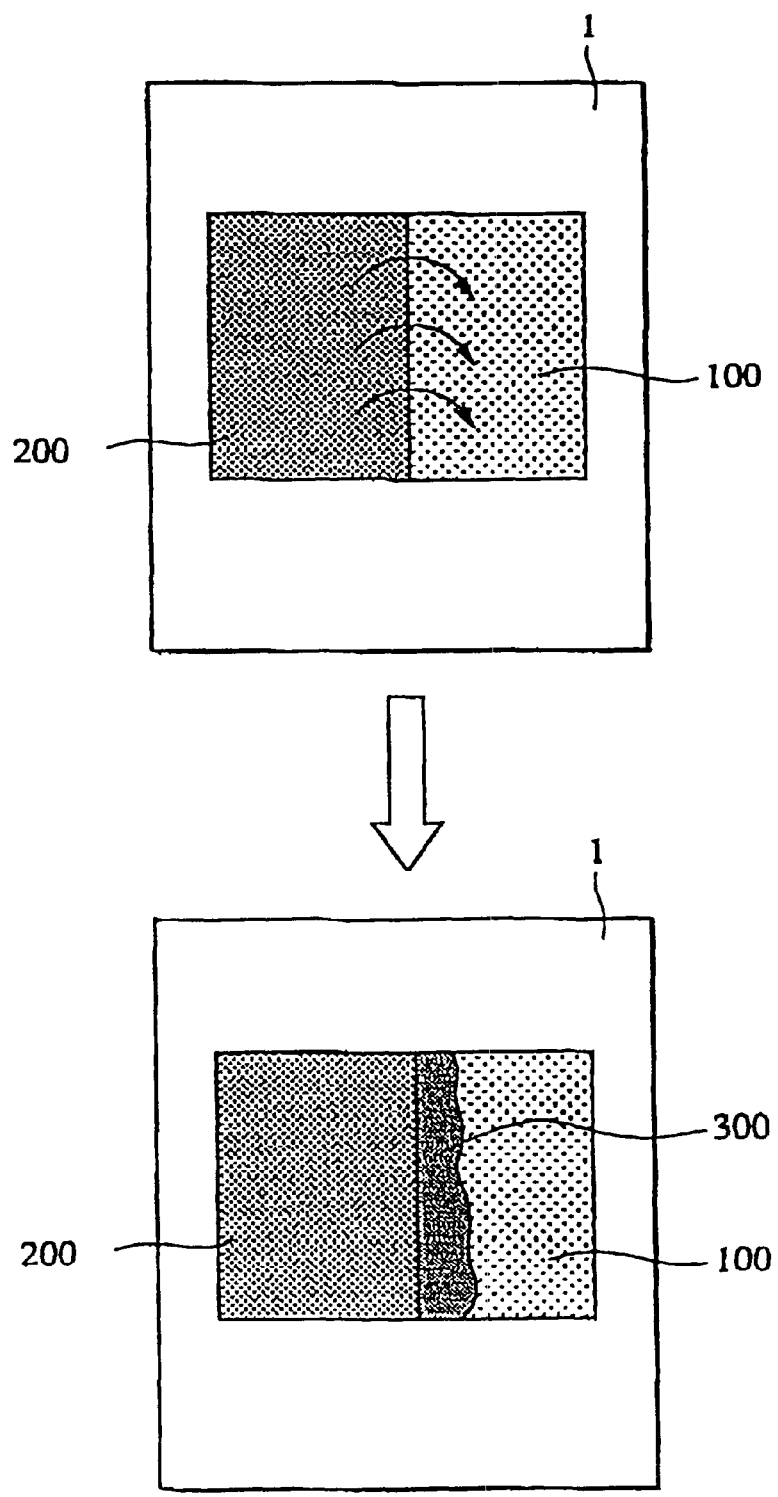
FIGS. 17 and 18 are views for explaining bleeding between differently colored regions.

One of the reasons that the elements on the print heads are aligned vertically, and are grouped in an order of decreasing color contrast starting with black at the bottom, is in an effort to reduce this bleeding. Specifically, for any given band on a page, the black band will be printed first. Then, the recording medium is advanced and the cyan color component for that band is applied. In like manner, the recording medium is advanced to apply the magenta color component and advanced again to apply the yellow component. Thus, there is a time interval during which the black color component exhibits at least partial evaporation from a time when the black color component is applied to when the lightest color (yellow) is applied. Nevertheless, bleeding still exists as is illustrated in FIG. 17. As seen there, a black region 200 which is initially printed adjacent a lighter color (for example, yellow) region 100 on recording medium 1 will eventually bleed into the lighter color region as illustrated at 300.

Generally speaking, according to this embodiment of the invention, bleeding is reduced by detecting the boundary between a black region and a different colored region and by replacing black pixels at the boundary of the region with a combination of all of cyan, magenta and yellow pixels. This combination will hereinafter be referred to as PCBk. As is known, a mixture of yellow, magenta and cyan inks produces a black color. However, since these inks are penetration type inks as opposed to the black evaporation type ink, a lower contrast, and hence less desirable black is obtained. Nevertheless, since black pixels at the boundary are replaced at only a short distance into the black region, such as four pixels or less, a viewer will generally not discern any difference. At the same time, use of PCBk to form black at the boundary reduces bleeding since a PCBk black, being a penetration-type ink, will not bleed into the adjacent penetration-type ink forming the different color. Bleeding does occur between the PCBk black and the standard evaporation-type black ink. Nevertheless, since this is merely a bleeding of black ink into a black color, no adverse visual affects are discerned by a viewer.

Figure 18:
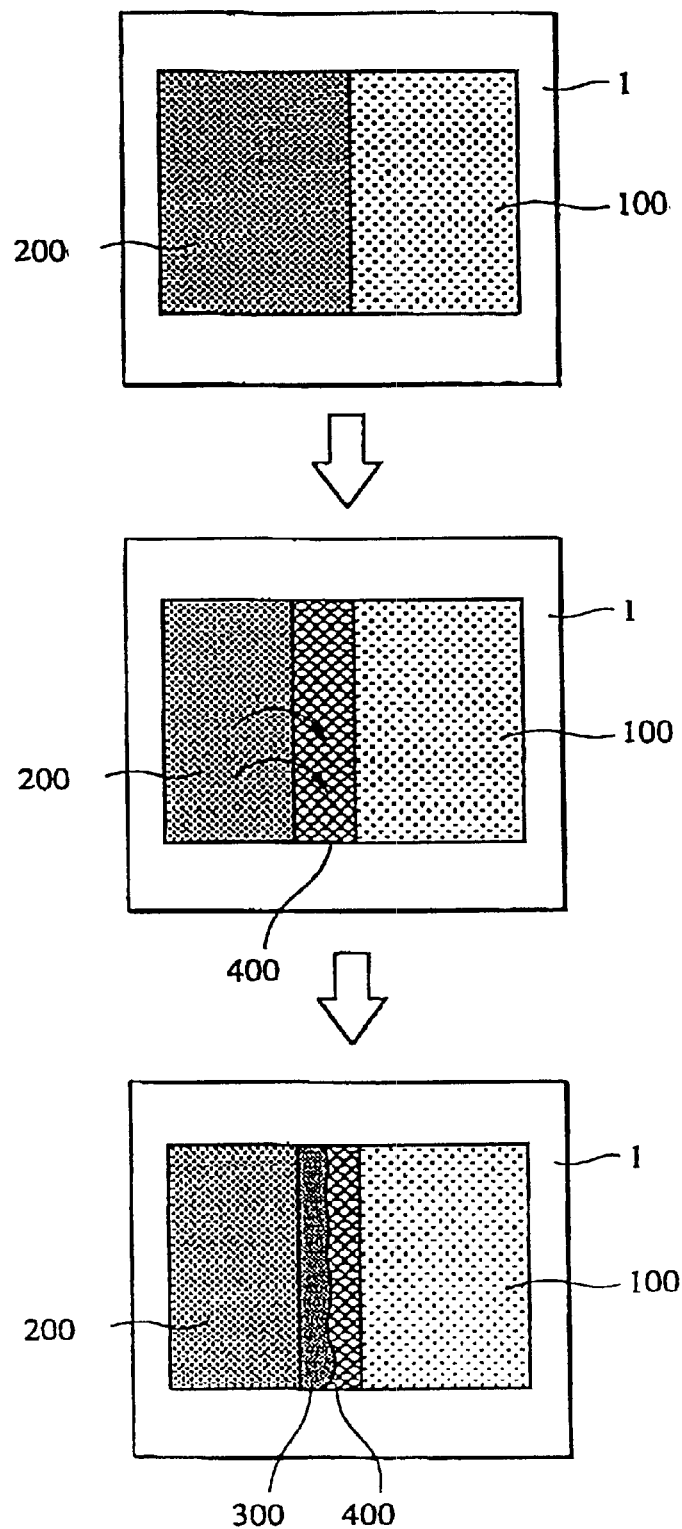

This process is illustrated diagrammatically in FIG. 18. As seen there, a black region 200 is adjacent a different color region 100 on recording medium 1. At the boundary between the black region and the different color region, black pixels are replaced with PCBk black as shown at 400. Thereafter, upon printing, no bleeding occurs between region 400 and region 100, whereas bleeding 300 that occurs between region 200 and region 400 does not produce an adverse visual effect.

Figure 19:
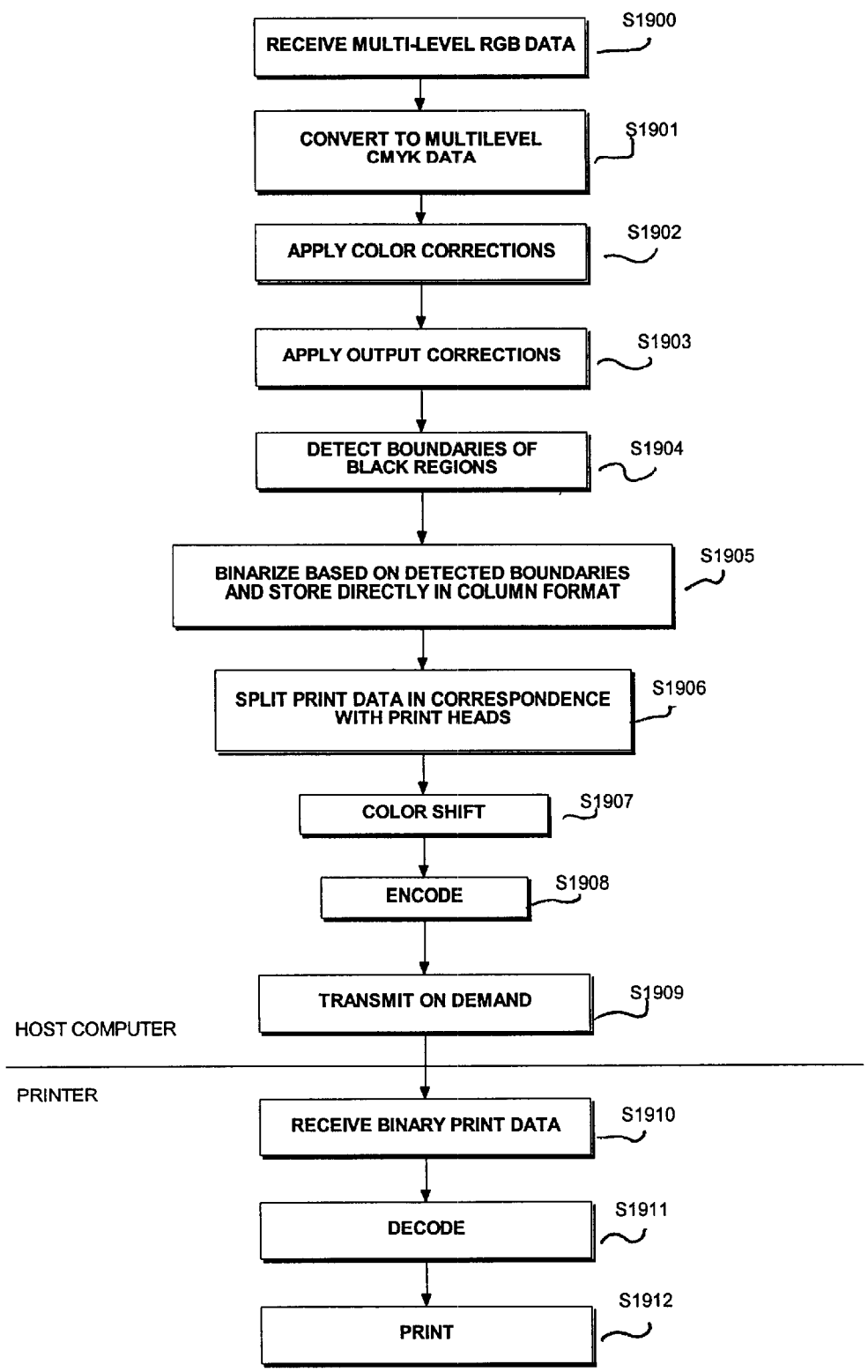
FIG. 19 is a flow diagram for explaining the process steps and code for a print driver according to a third embodiment of the invention.

FIG. 19 is a flow diagram illustrating this third embodiment. Generally speaking, the flow diagram of FIG. 19 is a print driver executable in a host computer so as to output binary print data corresponding to a raster image to a printer that has a print head with vertically-oriented print elements and that forms images in a band on a recording medium, with the printer being a color printer whose vertically-oriented print elements are arranged into plural groups respectively corresponding to each of plural subtractive color components including black. Multi-level data for each successive pixel of the raster image are accessed, and the boundaries of the black regions are detected in the multi-level data. The multi-level data for each successive pixel is binarized into binary print data such that pixels immediately adjacent the detected black boundary in a black region are binarized to PCBk black rather than to a black color component. The binarized data is then stored for each pixel directly in column format, and preferably without the intermediary of storage in horizontal raster format.

In more detail, steps S1900 through S1903 are identical to steps S1000 through S1003 and receive RGB multi-level data for a raster image, convert the RGB data into multilevel CMYK data, apply color corrections, and apply output corrections. Step S1904 detects boundaries of black regions in the multi-level CMYK image data. Preferably, step S1904 is performed using multi-level image data since it is easier and more accurate to detect boundaries of black regions in multi-level image data than in binary print data. Thereafter, step S1905 binarizes the multi-level image data, taking into account the detected boundaries of black regions. Specifically, when binarizing a black region which ordinarily is binarized simply by conversion to the black color component, pixels adjacent the detected boundary are assigned PCBk black values, meaning that magenta, cyan and yellow color components are printed in place of a black color component. The binarized data is then stored directly in column format as described in connection with step S1004 of FIG. 10.

Steps S1906 through S1912 are identical to steps S1005 through S1011, and cause the binary data to be split in correspondence with which data is printed by which print head, the binary data to be color shifted, encoded and transmitted on demand to printer 30, the print data to be received by printer 30, decoded and printed.

Fourth Embodiment

One way that the fourth embodiment differs from the modified first embodiment is that the split of print data in correspondence with respective print heads, and the compensation for head misalignment, are both performed simultaneously during binarization directly into column format. In more detail, as shown above in connection with FIG. 14 in reference to the modified first embodiment, memory buffers such as buffers 96 and 97 are needed to store binary print data for each of print heads 31a and 31b. However, in the modified first embodiment, an additional memory buffer is needed (i.e., memory buffer 95), to store the binarized column format print data prior to splitting the print data into data for print heads 31a and 31b. This fourth embodiment, since it separates print head data simultaneously during binarization, eliminates the need for a buffer like buffer 95, which otherwise would be needed to store binary print data prior to splitting it into data for print head 31a and print head 31b.

Figure 20:
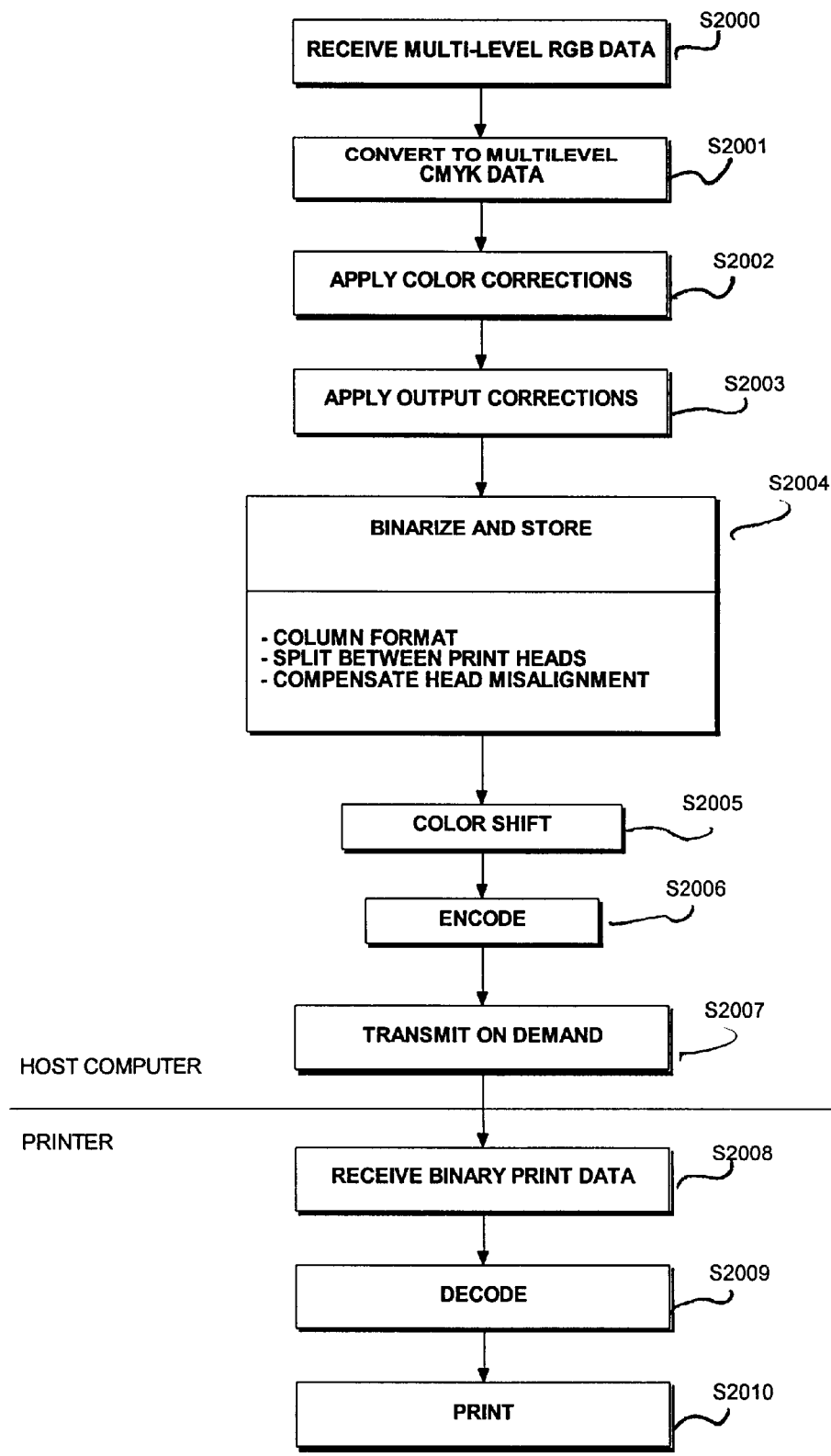
FIGS. 20 and 21 are views for explaining a fourth embodiment of the invention, which separates left and right print head data simultaneously with binarization.

FIG. 20 is a flow diagram showing process steps illustrating this fourth embodiment. Generally speaking, the process steps shown in FIG. 20 are a printer driver executable in a host computer so as to output binary print data corresponding to a raster image to a printer that includes multiple print heads each with vertically-oriented print elements and that forms images in a band on a recording medium. Multi-level data for each successive pixel of the raster image are accessed, and the multi-level data for each successive pixel is binarized into binary print data corresponding to a print element on each print head. The binarized data for each pixel is stored in a buffer directly in column format, with a separate buffer being provided for each print head. During storage, the print data for at least one of the print heads is shifted with respect to the print data for the other print head, so as to compensate for a vertical misalignment between the print heads.

In more detail, steps S2000 through S2003 are identical to steps S1300 through S1303, and operate to cause the print driver to receive multi-level RGB print data, covert to multi-level CMYK data, apply color corrections, and apply output corrections which do not include corrections for vertical misalignment between print head 31a and 31b.

Flow then advances to step S2004 in which the color corrected and output corrected multi-level CMYK data is binarized. Binarization according to step S2004 operates to binarize the multi-level data into binary pixel data for each of the cyan, magenta, yellow and black color planes, and to store the binarized print data in a specific format, and in specific memory buffers, as described below. First, the binarized data must be stored in column format, so as to obtain the aforementioned beneficial advantages of avoiding the need to reformat raster format data into column format data for printout by the vertically-oriented print heads. Second, the binarized data is stored so that it is split into two memory buffers, in correspondence to print heads 31a and 31b. Finally, the print data in one of the buffers is shifted relative to the print data in the other buffer, so as to compensate for head misalignment between the two print heads.

Figure 21:
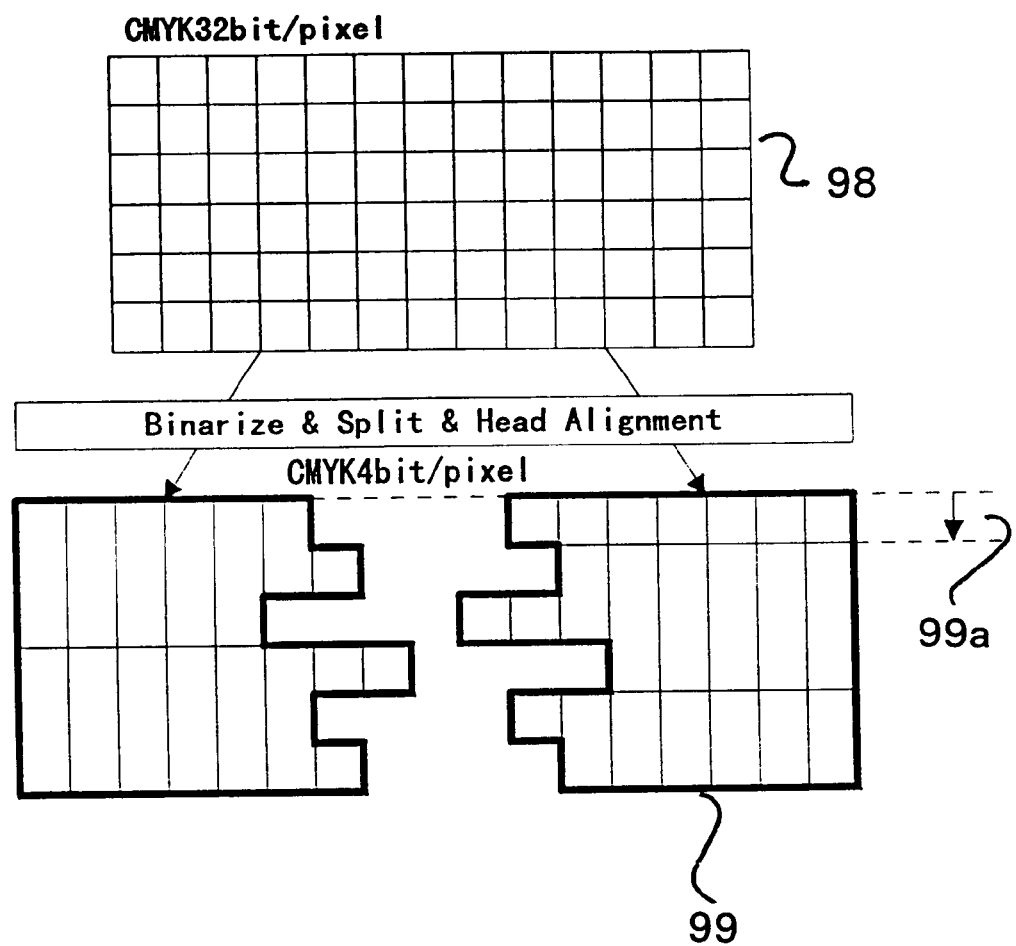

The overall process is illustrated diagrammatically in FIG. 21. As seen there, color-corrected and output-corrected multi-level CMYK data 98 is subjected to binarization according to step S2004. Binarization results in creation of binary print data from the multi-level image data, with the binary print data being stored in column format, split in correspondence with print heads 31a and 31b, and compensated for head misalignment. Thus, step S2004 results in storage of binary print data into a pair of memory buffers 99, with one of the memory buffers having binary data offset by an amount 99a corresponding to the numerical offset value between print head 31a and 31b.

Reverting to FIG. 20, steps S2005 through S2010 are identical to steps S1307 through S1312, and operate to color shift the binary print data for each color plane in correspondence with offset of color nozzle groups on the print head, to encode and transmit the binary print data on demand to printer 30, to cause the print data to be received by printer 30, decode it and print it.

Fifth Embodiment

One way that the fifth embodiment differs from the preceding embodiments is that binarization and other processing is performed in printer 30 rather than host computer 20. Such an embodiment is particularly useful in situations where print data is transmitted to the printer in the form of a page description language such as PCL5 or postscript.

Figure 1:
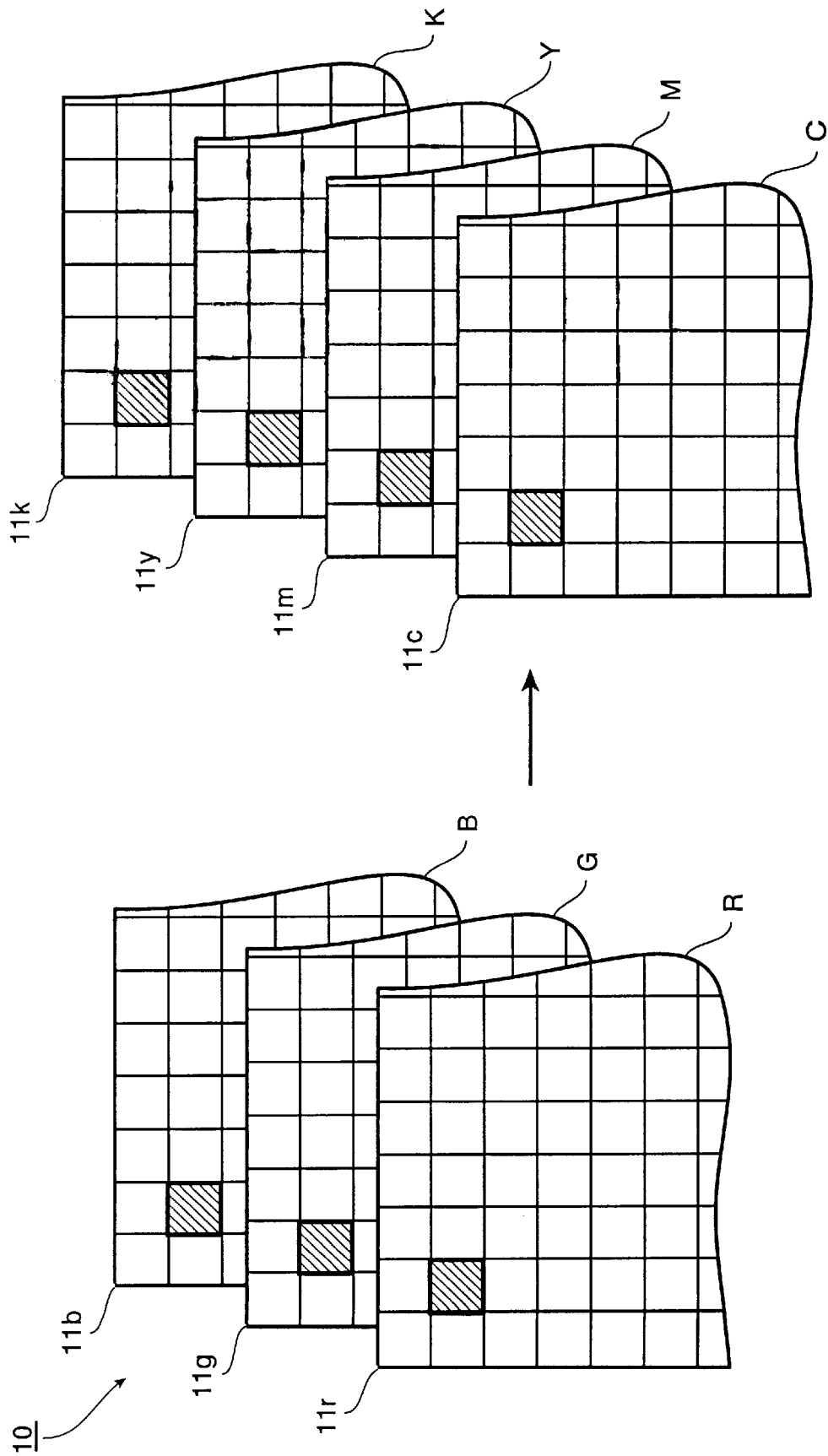
FIG. 1 is a representational view of a bitmap image for multi-level raster image data and binary print data.
Figure 2:
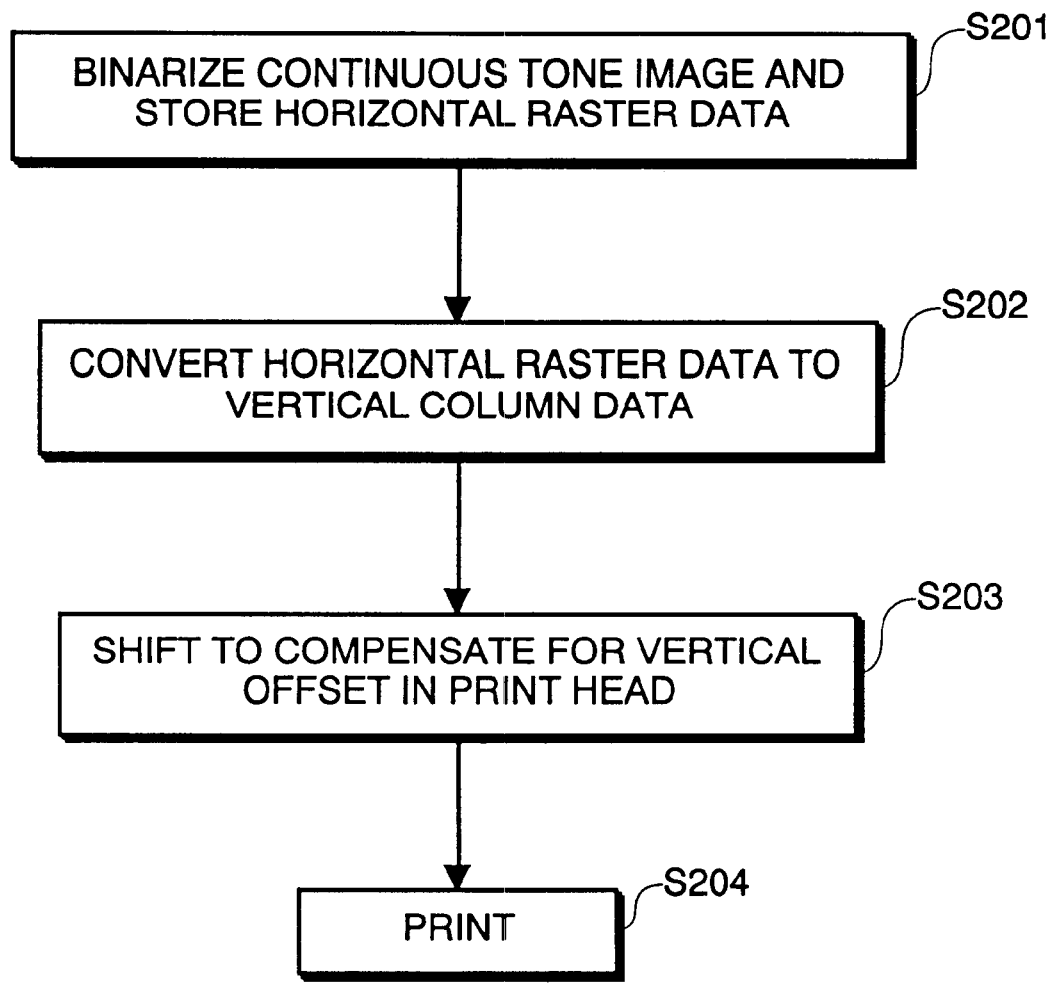
FIG. 2 is a flow diagram for illustrating a conventional printing driver process.
Figure 22:
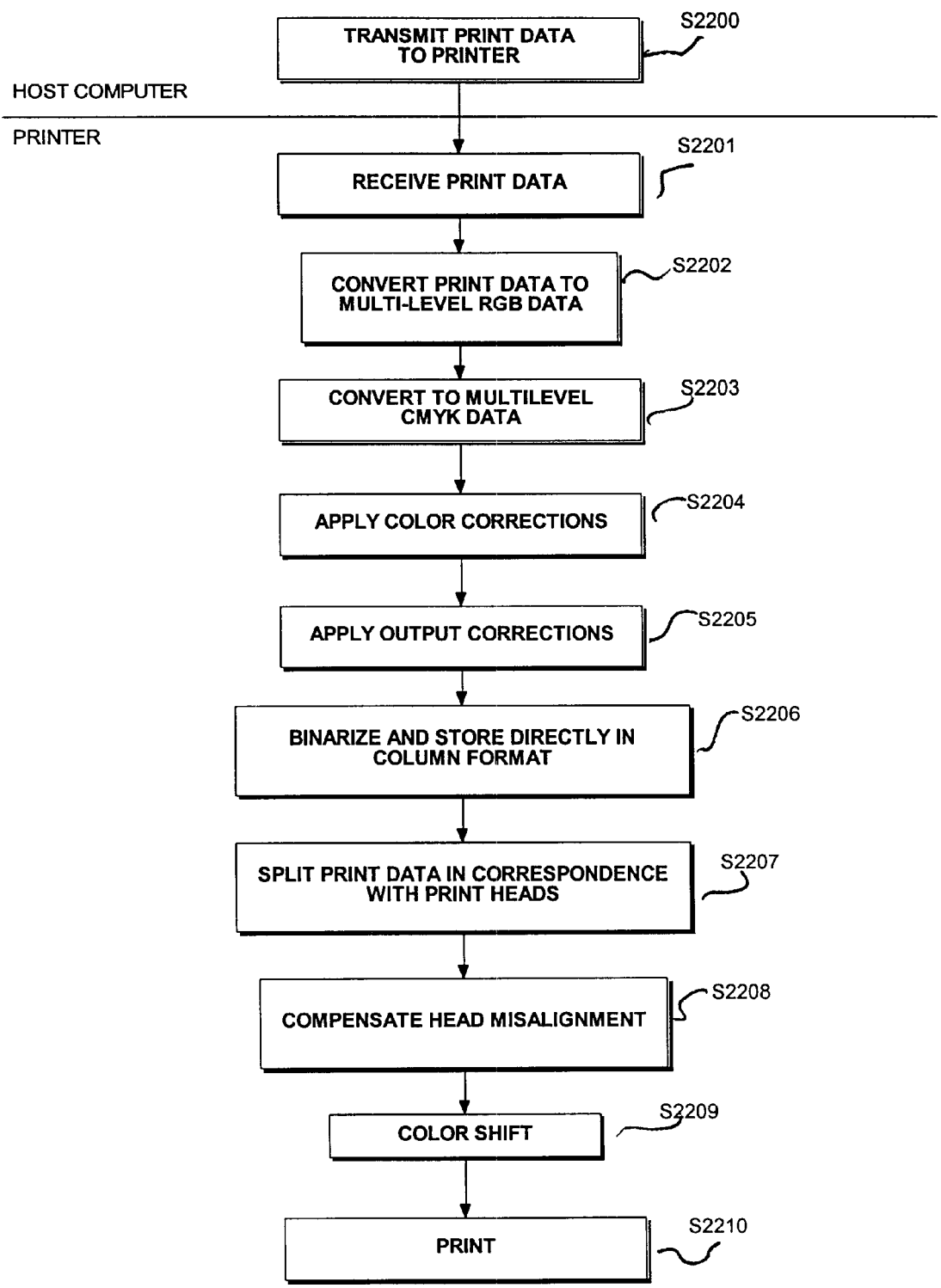
FIG. 22 is a flow diagram for explaining process steps and code according to a fifth embodiment of the invention.

The process steps shown in FIG. 22 may be executed by CPU 60 in accordance with stored program code in ROM 63. Likewise, the process steps shown in FIG. 2 may be executed by a print controller such as a FIERY print controller. Additionally, it is possible for the process steps shown in FIG. 22 to be hardwired into a gate array such as the aforementioned four-in-one gate array.

Generally speaking, the process steps shown in FIG. 22 cause print data to be transmitted from a host computer, preferably in encoded form such as a page description language, and to be received in a printer. Thereafter, the printer decodes the print data (if necessary) so as to convert the print data to multi-level RGB data, or directly into multi-level CMYK data. Color corrections and output corrections are applied, and the corrected data is thereafter binarized and stored directly in column format. The print data is split in correspondence with the print head that will print the print data, head misalignments are compensated for, color shifts are applied, and the binarized data is then printed.

In more detail, step S2200 transmits print data from host computer 20 to printer 30. Preferably, the print data is transmitted in encoded format such as a page description language including postscript and PCL5. Network operations including local area network and Internet networks are possible, in which case the print data is transmitted from host computer 20 onto the network.

In step S2201, printer 30 receives the print data. In the case of a network configuration, the print data is received by printer 30 from the network or Internet.

In step S2202, printer 30 converts the print data to multi-level RGB data, and in step S2203 the printer converts thereafter converts the data to CMYK data. Alternatively, it is possible for printer 30 to convert the print data received in step S2201 directly into multi-level CMYK data.

Step S2204 applies color corrections, step S2205 applies output corrections, and step S2206 binarizes and stores the corrected multi-level data directly into column format, all as described above in connection with steps S1302 through S1304 of the modified first embodiment.

Step S2207 splits the print data in correspondence with the appropriate print head, step S2208 compensates for head misalignment, and step S2209 color shifts the print data so as to compensate for vertical offset of groups of color nozzles on the print head, all as described above in connection with steps S1305 through S1307 of the modified first embodiment.

In step S2210, printer 30 prints the binarized print data, so as to effect printout of a color image corresponding to the print data transmitted in step S2200.

It is emphasized that several changes may be applied on the above-described embodiments of the invention without departing from the teaching of the invention. In particular, it is intended that all matter contained in the present disclosure, or shown in the accompanying drawings, shall be interpreted as illustrative and not limiting. It is also to be recognized that any combination of the foregoing five embodiments may be utilized, so that the specifics of any one embodiment may be combined with that of any other or several other embodiments. In particular, it should be understood that the processes and code illustrated in any of the first four embodiments may be performed in the printer as described in the fifth embodiment, and combinations of features in any of the first embodiments may likewise be performed in the printer.

What is claimed is:

1. A print driver, executable in a host computer, so as to output binary print data corresponding to a raster image to a printer that has a print head with vertically-oriented print elements and that forms images in a band on a recording medium, comprising:
    accessing multi-level data for successive pixels of the raster image;
    binarizing each successive pixel into binary print data corresponding to a print element on the print head; and
    storing the binarized data for each pixel directly in column format in a print data buffer.

2. A print driver according to claim 1, wherein the printer is a color printer whose vertically-oriented print elements are arranged into plural groups respectively corresponding to each of plural subtractive color components, wherein multi-level data is provided for each of plural additive color components, and wherein said binarizing step binarizes multi-level data for each successive pixel into binary data for each of the plural subtractive color components.

3. A print driver according to claim 2, wherein said color printer forms color images by superimposing plural scans respectively corresponding to each of the subtractive color components, and wherein the binarized print data in column format is shifted so as to account for vertical offset between each group of print elements.

4. A print driver according to claim 3, wherein the binarized-and-shifted column data is communicated from the host computer over an interface to the color printer for print out thereby.

5. A print driver according to claim 4, wherein the interface is a bi-directional interface.

6. A print driver according to claim 2, wherein the subtractive color components include a black color component and the print head has relatively more print elements for the black color component than for other color components, and further comprising the step of selecting different black print elements for successive recording mediums.

7. A print driver according to claim 2, further comprising the steps of detecting image boundary portions between differently-colored regions of the raster image, and replacing binarized print data for one color component with binarized print data for another color at the image boundary, so as to prevent bleeding.

8. A print driver according to claim 7, wherein a boundary portion is detected between a black region and a differently-colored region, and wherein pixels in the black region adjacent the detected boundary are replaced with PCBk pixels.

9. A print driver according to claim 7, wherein detection of image boundary portions is based on the multi-level data.

10. A print driver, executable in a host computer, so as to output binary print data for each of plural color components corresponding respectively to plural color planes of a raster image, the binary print data being output to a color printer that has a print head with vertically-oriented print elements arranged into plural groups respectively corresponding to each of the plural color components and that forms color images in a band on a recording medium by plural scans respectively corresponding to each of the plural color components, comprising:
    accessing multi-level data for successive pixels of the raster image;
    detecting image boundary portions between a black region of the raster image and a differently colored region;
    binarizing each successive pixel into binary print data corresponding to a print element on the print head, wherein pixels in the black region adjacent the boundary are binarized into PCBk black pixels; and
    storing the binarized data for each pixel directly into column format.

11. A print driver according to claim 10, wherein the binarized print data in column format is shifted so as to account for vertical offset between each group of print elements.

12. A print driver according to claim 11, wherein the binarized-and-shifted column data is communicated from the host computer over an interface to the color printer for print out thereby.

13. A print driver according to claim 12, wherein the interface is a bi-directional interface.

14. A print driver according to claim 11, wherein the print head has relatively more print elements for the black color component than for other color components, and further comprising the step of selecting different black print elements for successive recording mediums.

15. A print driver, executable in a host computer, so as to output binary print data for each of plural color components corresponding respectively to plural color planes of a raster image, the binary print data being output to a color printer that has a print head with vertically-oriented print elements arranged into plural groups respectively corresponding to each of the plural color components and that forms color images in a band on a recording medium by plural scans respectively corresponding to each of the plural color components, wherein the black color component has relatively more print elements than other color components, comprising:

accessing multi-level data for successive pixels of the raster image;

binarizing each successive pixel into binary print data corresponding to a print element on the print head;

storing the binarized print data for each pixel directly in column format; and shifting the binarized data for the black color component so as to cause different black print elements to be selected for successive recording operations.

16. A print driver according to claim 15, wherein the black component is shifted by an amount that is incremented for each successive recording medium.

17. A print driver according to claim 15, wherein said color printer forms color images by superimposing plural scans respectively corresponding to each of the subtractive color components, and wherein the binarized print data in column format is shifted so as to account for vertical offset between each group of print elements.

18. A print driver according to claim 15, wherein the binarized-and-shifted column data is communicated from the host computer over an interface to the color printer for print out thereby.

19. A print driver according to claim 18, wherein the interface is a bi-directional interface.

20. A print driver according to claim 15, further comprising the steps of detecting image boundary portions between differently-colored regions of the raster image, and replacing binarized print data for one color component with binarized print data for another color at the image boundary, so as to prevent bleeding.

21. A print driver according to claim 20, wherein a boundary portion is detected between a black region and a differently-colored region, and wherein pixels in the black region adjacent the detected boundary are replaced with PCBk pixels.

22. A print driver according to claim 20, wherein detection of image boundary portions is based on the multi-level data.

23. A print driver executable in a host computer so as to output binary print data corresponding to a raster image to a printer that has a print head with vertically-oriented print elements and that forms images in successive bands on a recording medium, comprising:

accepting graphic device interface commands from a windowing graphical device interface (GDI) environment so as to receive multi-level data for each of successive plural pixels in a print band of the raster image;

correcting the multi-level data by applying a color correction tailored to color output characteristics of the color printer, and by applying color corrections so as to compensate for output characteristics of the color printer;

binarizing the corrected multi-level data so as to obtain binary print data for each of plural color components printable by the color printer;

storing the binarized print data for each pixel directly in column format in a print buffer;

shifting the binary print data in the print buffer by an amount corresponding to a distance between each of plural groups into which the vertically-oriented print elements are formed;

selecting binary print data corresponding to a scanning band of the color printer, and to encode the selected binary print data; and transmitting the encoded binary print data over a transmission medium to the printer.

24. A print driver according to claim 23, wherein the color printer includes plural print heads and wherein said step of correcting the multi-level data includes correcting for differences in optical density when printing by different ones of the print heads.

25. A print driver according to claim 23, wherein the subtractive color components include a black color component and the print head has relatively more print elements for the black color component than for other color components, and further comprising the step of selecting different black print elements for successive recording mediums.

26. A print driver according to claim 23, further comprising the steps of detecting image boundary portions between differently-colored regions of the raster image, and replacing binarized print data for one color component with binarized print data for another color at the image boundary, so as to prevent bleeding.

27. A print driver according to claim 26, wherein a boundary portion is detected between a black region and a differently-colored region, and wherein pixels in the black region adjacent the detected boundary are replaced with PCBk pixels.

28. A print driver according to claim 26, wherein detection of image boundary portions is based on the multi-level data.

29. A print driver stored in a computer-readable medium and executable in a host computer, so as to output binary print data corresponding to a raster image to a printer that has a print head with vertically-oriented print elements and that forms images in a band on a recording medium, comprising:

code to access multi-level data for successive pixels of the raster image;

code to binarize each successive pixel into binary print data corresponding to a print element on the print head; and code to store the binarized data for each pixel directly in column format in a print data buffer.

30. A print driver according to claim 29, wherein the printer is a color printer whose vertically-oriented print elements are arranged into plural groups respectively corresponding to each of plural subtractive color components, wherein multi-level data is provided for each of plural additive color components, and wherein said binarizing step binarizes multi-level data for each successive pixel into binary data for each of the plural subtractive color components.

31. A print driver according to claim 30, wherein said color printer forms color images by superimposing plural scans respectively corresponding to each of the subtractive color components, and wherein the binarized print data in column format is shifted so as to account for vertical offset between each group of print elements.

32. A print driver according to claim 31, wherein the binarized-and-shifted column data is communicated from the host computer over an interface to the color printer for print out thereby.

33. A print driver according to claim 32, wherein the interface is a bi-directional interface.

34. A print driver according to claim 30, wherein the subtractive color components include a black color component and the print head has relatively more print elements for the black color component than for other color components, and further comprising code to select different black print elements for successive recording mediums.

35. A print driver according to claim 30, further comprising code to detect image boundary portions between differently-colored regions of the raster image, and code to replace binarized print data for one color component with binarized print data for another color at the image boundary, so as to prevent bleeding.

36. A print driver according to claim 35, wherein a boundary portion is detected between a black region and a differently-colored region, and wherein pixels in the black region adjacent the detected boundary are replaced with PCBk pixels.

37. A print driver according to claim 35, wherein detection of image boundary portions is based on the multi-level data.

38. A print driver, executable in a host computer, so as to output binary print data for each of plural color components corresponding respectively to plural color planes of a raster image, the binary print data being output to a color printer that has a print head with vertically-oriented print elements arranged into plural groups respectively corresponding to each of the plural color components and that forms color images in a band on a recording medium by plural scans respectively corresponding to each of the plural color components, comprising:
  code to access multi-level data for successive pixels of the raster image;
  code to detect image boundary portions between a black region of the raster image and a differently colored region;
  code to binarize each successive pixel into binary print data corresponding to a print element on the print head, wherein pixels in the black region adjacent the boundary are binarized into PCBk black pixels; and
  code to store the binarized data for each pixel directly into column format.

39. A print driver according to claim 38, wherein the binarized print data in column format is shifted so as to account for vertical offset between each group of print elements.

40. A print driver according to claim 39, wherein the binarized-and-shifted column data is communicated from the host computer over an interface to the color printer for print out thereby.

41. A print driver according to claim 40, wherein the interface is a bi-directional interface.

42. A print driver according to claim 40, wherein the print head has relatively more print elements for the black color component than for other color components, and further comprising code to select different black print elements for successive recording mediums.

43. A print driver, executable in a host computer, so as to output binary print data for each of plural color components corresponding respectively to plural color planes of a raster image, the binary print data being output to a color printer that has a print head with vertically-oriented print elements arranged into plural groups respectively corresponding to each of the plural color components and that forms color images in a band on a recording medium by plural scans respectively corresponding to each of the plural color components, wherein the black color component has relatively more print elements than other color components, comprising:
  code to access multi-level data for successive pixels of the raster image;
  code to binarize each successive pixel into binary print data corresponding to a print element on the print head;
  code to store the binarized print data for each pixel directly in column format; and
  code to shift the binarized data for the black color component so as to cause different black print elements to be selected for successive recording operations.

44. A print driver according to claim 43, wherein the black component is shifted by an amount that is incremented for each successive recording medium.

45. A print driver according to claim 44, wherein said color printer forms color images by superimposing plural scans respectively corresponding to each of the subtractive color components, and wherein the binarized print data in column format is shifted so as to account for vertical offset between each group of print elements.

46. A print driver according to claim 44, wherein the binarized-and-shifted column data is communicated from the host computer over an interface to the color printer for print out thereby.

47. A print driver according to claim 46, wherein the interface is a bi-directional interface.

48. A print driver according to claim 46, further comprising code to detect image boundary portions between differently-colored regions of the raster image, and code to replace binarized print data for one color component with binarized print data for another color at the image boundary, so as to prevent bleeding.

49. A print driver according to claim 48, wherein a boundary portion is detected between a black region and a differently-colored region, and wherein pixels in the black region adjacent the detected boundary are replaced with PCBk pixels.

50. A print driver according to claim 48, wherein detection of image boundary portions is based on the multi-level data.

51. A print driver executable in a host computer so as to output binary print data corresponding to a raster image to a printer that has a print head with vertically-oriented print elements and that forms images in successive bands on a recording medium, comprising:
  code to accept graphic device interface commands from a windowing graphical device interface (GDI) environment so as to receive multi-level data for each of successive plural pixels in a print band of the raster image;
  code to correct the multi-level data by applying a color correction tailored to color output characteristics of the color printer, and by applying color corrections so as to compensate for output characteristics of the color printer;
  code to binarize the corrected multi-level data so as to obtain binary print data for each of plural color components printable by the color printer;
  code to store the binarized print data for each pixel directly in column format in a print buffer;
  code to shift the binary print data in the print buffer by an amount corresponding to a distance between each of plural groups into which the vertically-oriented print elements are formed;
  code to select binary print data corresponding to a scanning band of the color printer, and to encode the selected binary print data; and
  code to transmit the encoded binary print data over a transmission medium to the printer.

52. A print driver according to claim 51, wherein the color printer includes plural print heads and wherein said step of correcting the multi-level data includes correcting for differences in optical density when printing by different ones of the print heads.

53. A print driver according to claim 51, wherein the subtractive color components include a black color component and the print head has relatively more print elements for the black color component than for other color components, and further comprising code to select different black print elements for successive recording mediums.

54. A print driver according to claim 51, further comprising code to detect image boundary portions between differently-colored regions of the raster image, and code to replace binarized print data for one color component with binarized print data for another color at the image boundary, so as to prevent bleeding.

55. A print driver according to claim 54, wherein a boundary portion is detected between a black region and a differently-colored region, and wherein pixels in the black region adjacent the detected boundary are replaced with PCBk pixels.

56. A print driver according to claim 54, wherein detection of image boundary portions is based on the multi-level data.

57. A print driver, executable in a host computer, so as to output binary print data corresponding to a raster image to a printer that has plural print heads each with vertically-oriented print elements and that forms images in a band on a recording medium, comprising:

accessing multi-level data for successive pixels of the raster image;

binarizing each successive pixel into binary print data corresponding to a print element on the print head; and storing the binarized print data for each pixel directly in column format in plural print data buffers, with one print data buffer being provided in correspondence to each of the plural print heads.

58. A print driver according to claim 57, further comprising shifting the binarized data in at least one of the plural print data buffers with respect to others of the plural print data buffers, so as to compensate for head misalignment between the plural print heads.

59. A print driver according to claim 58, wherein the shift amount corresponds to a numerical offset value.

60. A print driver according to claim 57, wherein the printer is a color printer whose vertically-oriented print elements are arranged into plural groups respectively corresponding to each of plural subtractive color components, wherein multi-level data is provided for each of plural additive color components, and wherein said binarizing step binarizes multi-level data for each successive pixel into binary data for each of the plural subtractive color components.

61. A print driver according to claim 60, wherein said color printer forms color images by superimposing plural scans respectively corresponding to each of the subtractive color components, and wherein the binarized print data in column format is shifted so as to account for vertical offset between each group of print elements.

62. A print driver according to claim 61, wherein the binarized-and-shifted column data is communicated from the host computer over an interface to the color printer for print out thereby.

63. A print driver according to claim 62, wherein the interface is a bi-directional interface.

64. A computer readable medium on which is stored code for a print driver executable in a host computer so as to output binary print data corresponding to a raster image to a printer that has a print head with vertically-oriented print elements and that forms images in a band on a recording medium, the code comprising:

code to access multi-level data for successive pixels of the raster image;

code to binarize each successive pixel into binary print data corresponding to a print element on the print head; and code to store the binarized data for each pixel directly in column format in a print data buffer.

65. A computer readable medium according to claim 64, wherein the printer is a color printer whose vertically-oriented print elements are arranged into plural groups respectively corresponding to each of plural subtractive color components, wherein multi-level data is provided for each of plural additive color components, and wherein said binarizing step binarizes multi-level data for each successive pixel into binary data for each of the plural subtractive color components.

66. A computer readable medium according to claim 65, wherein said color printer forms color images by superimposing plural scans respectively corresponding to each of the subtractive color components, and wherein the binarized print data in column format is shifted so as to account for vertical offset between each group of print elements.

67. A computer readable medium according to claim 66, wherein the binarized-and-shifted column data is communicated from the host computer over an interface to the color printer for print out thereby.

68. A computer readable medium according to claim 67, wherein the interface is a bi-directional interface.

69. A computer readable medium according to claim 64, wherein the subtractive color components include a black color component and the print head has relatively more print elements for the black color component than for other color components, and further comprising code to select different black print elements for successive recording mediums.

70. A computer readable medium according to claim 64, further comprising code to detect image boundary portions between differently-colored regions of the raster image, and code to replace binarized print data for one color component with binarized print data for another color at the image boundary, so as to prevent bleeding.

71. A computer readable medium according to claim 69, wherein a boundary portion is detected between a black region and a differently-colored region, and wherein pixels in the black region adjacent the detected boundary are replaced with PCBk pixels.

72. A computer readable medium according to claim 69, wherein detection of image boundary portions is based on the multi-level data.

73. A computer readable medium on which is stored code for a print driver executable in a host computer, so as to output binary print data for each of plural color components corresponding respectively to plural color planes of a raster image, the binary print data being output to a color printer that has a print head with vertically-oriented print elements arranged into plural groups respectively corresponding to each of the plural color components and that forms color images in a band on a recording medium by plural scans respectively corresponding to each of the plural color components, the code comprising:

code to access multi-level data for successive pixels of the raster image;

code to detect image boundary portions between a black region of the raster image and a differently colored region;

code to binarize each successive pixel into binary print data corresponding to a print element on the print head, wherein pixels in the black region adjacent the boundary are binarized into PCBk black pixels; and code to store the binarized data for each pixel directly into column format.

74. A computer readable medium according to claim 73, wherein the binarized print data in column format is shifted so as to account for vertical offset between each group of print elements.

75. A computer readable medium according to claim 74, wherein the binarized-and-shifted column data is communicated from the host computer over an interface to the color printer for print out thereby.

76. A computer readable medium according to claim 75, wherein the interface is a bi-directional interface.

77. A computer readable medium according to claim 76, wherein the print head has relatively more print elements for the black color component than for other color components, and further comprising code to select different black print elements for successive recording mediums.

78. A computer readable medium on which is stored code for a print driver executable in a host computer, so as to output binary print data for each of plural color components corresponding respectively to plural color planes of a raster image, the binary print data being output to a color printer that has a print head with vertically-oriented print elements arranged into plural groups respectively corresponding to each of the plural color components and that forms color images in a band on a recording medium by plural scans respectively corresponding to each of the plural color components, wherein the black color component has relatively more print elements than other color components, the code comprising:

code to access multi-level data for successive pixels of the raster image;

code to binarize each successive pixel into binary print data corresponding to a print element on the print head;

code to store the binarized print data for each pixel directly in column format; and code to shift the binarized data for the black color component so as to cause different black print elements to be selected for successive recording operations.

79. A computer readable medium according to claim 78, wherein the black component is shifted by an amount that is incremented for each successive recording medium.

80. A computer readable medium according to claim 79, wherein said color printer forms color images by superimposing plural scans respectively corresponding to each of the subtractive color components, and wherein the binarized print data in column format is shifted so as to account for vertical offset between each group of print elements.

81. A computer readable medium according to claim 79, wherein the binarized-and-shifted column data is communicated from the host computer over an interface to the color printer for print out thereby.

82. A computer readable medium according to claim 81, wherein the interface is a bi-directional interface.

83. A computer readable medium according to claim 81, further comprising code to detect image boundary portions between differently-colored regions of the raster image, and code to replace binarized print data for one color component with binarized print data for another color at the image boundary, so as to prevent bleeding.

84. A computer readable medium according to claim 83, wherein a boundary portion is detected between a black region and a differently-colored region, and wherein pixels in the black region adjacent the detected boundary are replaced with PCBk pixels.

85. A computer readable medium according to claim 83, wherein detection of image boundary portions is based on the multi-level data.

86. A computer readable medium on which is stored code for a print driver executable in a host computer so as to output binary print data corresponding to a raster image to a printer that has a print head with vertically-oriented print elements and that forms images in successive bands on a recording medium, the code comprising:

code to accept graphic device interface commands from a windowing graphical device interface (GDI) environment so as to receive multi-level data for each of successive plural pixels in a print band of the raster image;

code to correct the multi-level data by applying a color correction tailored to color output characteristics of the color printer, and by applying color corrections so as to compensate for output characteristics of the color printer;

code to binarize the corrected multi-level data so as to obtain binary print data for each of plural color components printable by the color printer;

code to store the binarized print data for each pixel directly in column format in a print buffer;

code to shift the binary print data in the print buffer by an amount corresponding to a distance between each of plural groups into which the vertically-oriented print elements are formed;

code to select binary print data corresponding to a scanning band of the color printer, and to encode the selected binary print data; and code to transmit the encoded binary print data over a transmission medium to the printer.

87. A computer readable medium according to claim 86, wherein the color printer includes plural print heads and wherein said step of correcting the multi-level data includes correcting for differences in optical density when printing by different ones of the print heads.

88. A computer readable medium according to claim 86, wherein the subtractive color components include a black color component and the print head has relatively more print elements for the black color component than for other color components, and further comprising code to select different black print elements for successive recording mediums.

89. A computer readable medium according to claim 86, further comprising code to detect image boundary portions between differently-colored regions of the raster image, and code to replace binarized print data for one color component with binarized print data for another color at the image boundary, so as to prevent bleeding.

90. A computer readable medium according to claim 89, wherein a boundary portion is detected between a black region and a differently-colored region, and wherein pixels in the black region adjacent the detected boundary are replaced with PCBk pixels.

91. A computer readable medium according to claim 89, wherein detection of image boundary portions is based on the multi-level data.

92. A computer readable medium on which is stored code for a print driver executable in a host computer, so as to output binary print data corresponding to a raster image to a printer that has plural print heads each with vertically-oriented print elements and that forms images in a band on a recording medium, the code comprising:

code to access multi-level data for successive pixels of the raster image;

code to binarize each successive pixel into binary print data corresponding to a print element on the print head; and code to store the binarized print data for each pixel directly in column format in plural print data buffers, with one print data buffer being provided in correspondence to each of the plural print heads.

93. A computer readable medium according to claim 92, further comprising code to shift the binarized data in at least one of the plural print data buffers with respect to others of the plural print data buffers, so as to compensate for head misalignment between the plural print heads.

94. A computer readable medium according to claim 93, wherein the shift amount corresponds to a numerical offset value.

95. A computer readable medium according to claim 92, wherein the printer is a color printer whose vertically-oriented print elements are arranged into plural groups respectively corresponding to each of plural subtractive color components, wherein multi-level data is provided for each of plural additive color components, and wherein said code to binarize binarizes multi-level data for each successive pixel into binary data for each of the plural subtractive color components.

96. A computer readable medium according to claim 95, wherein said color printer forms color images by superimposing plural scans respectively corresponding to each of the subtractive color components, and wherein the binarized print data in column format is shifted so as to account for vertical offset between each group of print elements.

97. A computer readable medium according to claim 96, wherein the binarized-and-shifted column data is communicated from the host computer over an interface to the color printer for print out thereby.

98. A computer readable medium according to claim 97, wherein the interface is a bi-directional interface.

99. A printing system comprising:

an ink jet printer having at least one print head with vertically-oriented print elements and forming images in a band on a recording medium, said ink jet printer including a print interface to receive binary print data corresponding to a raster image; and a host computer including a print driver executable thereon to access multi-level data for successive pixels of the raster image, to binarize each successive pixel into binary print data corresponding to a print element on the print head, to store the binarized data for each pixel directly in column format in a print data buffer, and to transmit the binarized print data from the buffer to said print interface.

100. A printing system according to claim 99, wherein the printer is a color printer whose vertically-oriented print elements are arranged into plural groups respectively corresponding to each of plural subtractive color components, wherein multi-level data is provided for each of plural additive color components, and wherein said multi-level data is binarized for each successive pixel into binary data for each of the plural subtractive color components.

101. A printing system according to claim 100, wherein said color printer forms color images by superimposing plural scans respectively corresponding to each of the subtractive color components, and wherein the binarized print data in column format is shifted so as to account for vertical offset between each group of print elements.

102. A printing system according to claim 101, wherein the binarized-and-shifted column data is communicated from the host computer over an interface in the host computer to the color printer for print out thereby.

103. A printing system according to claim 102, wherein the interface is a bi-directional interface.

104. A printing system according to claim 102, wherein the subtractive color components include a black color component and the print head has relatively more print elements for the black color component than for other color components, and wherein said print driver selects different black print elements for successive recording mediums.

105. A printing system according to claim 102, wherein said print driver detects image boundary portions between differently-colored regions of the raster image, and replaces binarized print data for one color component with binarized print data for another color at the image boundary, so as to prevent bleeding.

106. A printing system according to claim 105, wherein a boundary portion is detected between a black region and a differently-colored region, and wherein pixels in the black region adjacent the detected boundary are replaced with PCBk pixels.

107. A printing system according to claim 105, wherein detection of image boundary portions is based on the multi-level data.

108. A printing system comprising:

a color ink jet printer having at least one print head with vertically-oriented print elements arranged into plural groups respectively corresponding to each of plural color components and forming color images in a band on a recording medium by plural scans respectively corresponding to each of the plural color components, said ink jet printer including a print interface to receive binary print data corresponding to a raster image; and a host computer including a print driver executable thereon to access multi-level data for successive pixels of the raster image, to detect image boundary portions between a black region of the raster image and a differently colored region, to binarize each successive pixel into binary print data corresponding to a print element on the print head, wherein pixels in the black region adjacent the boundary are binarized into PCBk black pixels, to store the binarized data for each pixel directly into column format, and to transmit the binarized print data from the buffer to said print interface.

109. A printing system according to claim 108, wherein the binarized print data in column format is shifted so as to account for vertical offset between each group of print elements.

110. A printing system according to claim 109, wherein the binarized-and-shifted column data is communicated from the host computer over an interface in the host computer to the color printer for print out thereby.

111. A printing system according to claim 110, wherein the interface is a bi-directional interface.

112. A printing system according to claim 110, wherein the print head has relatively more print elements for the black color component than for other color components, and wherein the print driver selects different black print elements for successive recording mediums.

113. A printing system comprising:

a color ink jet printer having at least one print head with vertically-oriented print elements arranged into plural groups respectively corresponding to each of plural color components and forming color images in a band on a recording medium by plural scans respectively corresponding to each of the plural color components, wherein the black color component has relatively more print elements than other color components, said ink jet printer including a print interface to receive binary print data corresponding to a raster image; and a host computer including a print driver executable thereon to access multi-level data for successive pixels of the raster image, to binarize each successive pixel into binary print data corresponding to a print element on the print head, to store the binarized print data for each pixel directly in column format, to shift the binarized data for the black color component so as to cause different black print elements to be selected for successive recording operations, and to transmit the binarized print data from the buffer to said print interface.

114. A printing system according to claim 113, wherein the black component is shifted by an amount that is incremented for each successive recording medium.

115. A printing system according to claim 113, wherein said color printer forms color images by superimposing plural scans respectively corresponding to each of the subtractive color components, and wherein the binarized print data in column format is shifted so as to account for vertical offset between each group of print elements.

116. A printing system according to claim 113, wherein the binarized-and-shifted column data is communicated from the host computer over an interface to the color printer for print out thereby.

117. A printing system according to claim 116, wherein the interface is a bi-directional interface.

118. A printing system according to claim 113, wherein said print driver detects image boundary portions between differently-colored regions of the raster image, and replaces binarized print data for one color component with binarized print data for another color at the image boundary, so as to prevent bleeding.

119. A printing system according to claim 118, wherein a boundary portion is detected between a black region and a differently-colored region, and wherein pixels in the black region adjacent the detected boundary are replaced with PCBk pixels.

120. A printing system according to claim 118, wherein detection of image boundary portions is based on the multi-level data.

121. A printing system comprising:

an ink jet printer having at plural print heads each with vertically-oriented print elements for forming images in a band on a recording medium, said ink jet printer including a print interface to receive binary print data corresponding to a raster image; and a host computer including a print driver, executable thereon to access multi-level data for successive pixels of the raster image, to binarize each successive pixel into binary print data corresponding to a print element on the print head, to store the binarized print data for each pixel directly in column format in plural print data buffers, with one print data buffer being provided in correspondence to each of the plural print heads, and to transmit the binarized print data from the buffers to said print interface.

122. A printing system according to claim 121, wherein the print driver shifts the binarized data in at least one of the plural print data buffers with respect to others of the plural print data buffers, so as to compensate for head misalignment between the plural print heads.

123. A printing system according to claim 122, wherein the shift amount corresponds to a numerical offset value.

124. A printing system according to claim 121, wherein the printer is a color printer whose vertically-oriented print elements are arranged into plural groups respectively corresponding to each of plural subtractive color components, wherein multi-level data is provided for each of plural additive color components, and wherein multi-level data is binarized for each successive pixel into binary data for each of the plural subtractive color components.

125. A printing system according to claim 124, wherein said color printer forms color images by superimposing plural scans respectively corresponding to each of the subtractive color components, and wherein the binarized print data in column format is shifted so as to account for vertical offset between each group of print elements.

126. A printing system according to claim 125, wherein the binarized-and-shifted column data is communicated from the host computer over an interface to the color printer for print out thereby.

127. A printing system according to claim 126, wherein the interface is a bi-directional interface.

128. A print method for printing binary print data with a printer that has a print head with vertically-oriented print elements and that forms printed images in a band on a recording medium, comprising:

accessing multi-level data for successive pixels of the raster image;

binarizing each successive pixel into binary print data corresponding to a print element on the print head; and storing the binarized data for each pixel directly in column format in a print data buffer.

129. A print method according to claim 128, wherein the printer is a color printer whose vertically-oriented print elements are arranged into plural groups respectively corresponding to each of plural subtractive color components, wherein multi-level data is provided for each of plural additive color components, and wherein said binarizing step binarizes multi-level data for each successive pixel into binary data for each of the plural subtractive color components.

130. A print method according to claim 129, wherein said color printer forms color images by superimposing plural scans respectively corresponding to each of the subtractive color components, and wherein the binarized print data in column format is shifted so as to account for vertical offset between each group of print elements.

131. A print method according to claim 130, wherein the binarized-and-shifted column data is communicated from the host computer over an interface to the color printer for print out thereby.

132. A print method according to claim 131, wherein the interface is a bi-directional interface.

133. A print method according to claim 129, wherein the subtractive color components include a black color component and the print head has relatively more print elements for the black color component than for other color components, and further comprising the step of selecting different black print elements for successive recording mediums.

134. A print method according to claim 129, further comprising the steps of detecting image boundary portions between differently-colored regions of the raster image, and replacing binarized print data for one color component with binarized print data for another color at the image boundary, so as to prevent bleeding.

135. A print method according to claim 134, wherein a boundary portion is detected between a black region and a differently-colored region, and wherein pixels in the black region adjacent the detected boundary are replaced with PCBk pixels.

136. A print method according to claim 134, wherein detection of image boundary portions is based on the multi-level data.

137. A print method according to claim 128, wherein the method is executed in a printer.

138. A print method for printing binary print data with a color printer that has a print head with vertically-oriented print elements arranged into plural groups respectively corresponding to each of plural color components and that forms color images in a band on a recording medium by plural scans respectively corresponding to each of the plural color components, comprising:

accessing multi-level data for successive pixels of the raster image;

detecting image boundary portions between a black region of the raster image and a differently colored region;

binarizing each successive pixel into binary print data corresponding to a print element on the print head, wherein pixels in the black region adjacent the boundary are binarized into PCBk black pixels; and storing the binarized data for each pixel directly into column format.

139. A print method according to claim 138, wherein the binarized print data in column format is shifted so as to account for vertical offset between each group of print elements.

140. A print method according to claim 139, wherein the binarized-and-shifted column data is communicated from the host computer over an interface to the color printer for print out thereby.

141. A print method according to claim 140, wherein the interface is a bi-directional interface.

142. A print method according to claim 139, wherein the print head has relatively more print elements for the black color component than for other color components, and further comprising the step of selecting different black print elements for successive recording mediums.

143. A print method according to claim 138, wherein the method is executed in the color printer.

* * * * *

UNITED STATES PATENT AND TRADEMARK OFFICE
CERTIFICATE OF CORRECTION

PATENT NO.    : 6,339,480 B1
DATED         : January 15, 2002
INVENTOR(S)   : Akitoshi Yamada et al.

It is certified that error appears in the above-identified patent and that said Letters Patent is hereby corrected as shown below:

Title page,
Item 56, References Cited, U.S. PATENT DOCUMENTS, "5,619,622" should read -- 5,629,622 --.

Column 8,
Line 65, "to as to" should read -- so as to --.

Column 13,
Line 31, "element" should read -- elements --.

Column 15,
Line 59, "covert" should read -- convert --.

Column 24,
Line 66, "differently colored" should read -- differently-colored --.

Column 31,
Line 13, "differently colored" should read -- differently-colored --.

Signed and Sealed this

Fourth Day of June, 2002

Attest:

*Attesting Officer*

JAMES E. ROGAN
*Director of the United States Patent and Trademark Office*